United States Patent
Hui et al.

(10) Patent No.: US 7,362,709 B1
(45) Date of Patent: Apr. 22, 2008

(54) AGILE DIGITAL COMMUNICATION NETWORK WITH RAPID REROUTING

(75) Inventors: Joseph Y. Hui, Fountain Hills, AZ (US); Bernard M. Van Emden, Scottsdale, AZ (US)

(73) Assignee: Arizona Board of Regents, Tempe, AZ (US)

( * ) Notice: Subject to any disclaimer, the term of this patent is extended or adjusted under 35 U.S.C. 154(b) by 1098 days.

(21) Appl. No.: 10/287,996

(22) Filed: Nov. 4, 2002

Related U.S. Application Data

(60) Provisional application No. 60/336,330, filed on Nov. 2, 2001.

(51) Int. Cl.
*H04L 1/00* (2006.01)
*G06F 15/173* (2006.01)

(52) U.S. Cl. .................. 370/237; 370/221; 370/238; 709/239; 709/241

(58) Field of Classification Search ........ 370/229–238, 370/216–221, 392, 400–406; 709/238–243
See application file for complete search history.

(56) References Cited

U.S. PATENT DOCUMENTS 6,247,077 B1    6/2001   Muller et al.

(Continued)

OTHER PUBLICATIONS

Kodialam, et al., (2001), IEEE INFOCOM, "Dynamic Routing of Locally Restorable Bandwidth Guaranteed Tunnels Using Aggregated Link Usage Information," pp. 376-385.

(Continued)

*Primary Examiner*—Chi Phan
*Assistant Examiner*—Tri H. Phan

(74) *Attorney, Agent, or Firm*—McDonnell Boehnen Hulbert & Berghoff LLP

(57) ABSTRACT

An agile digital communications network has a number of routers that serve as nodes in a mesh network communicating between a user device (e.g., computer, server, etc.) and a target device (e.g., disc storage cabinets, tape, jukebox, etc.). The routers operate on an open shortest path first protocol, each router having two or more interfaces or links to other routers. When a link connected to a router is down and is in the shortest path to another router identified in a communication packet, the packet is forwarded to the identified router on a precalculated alternate route that does not use the unavailable link. IP tunneling assures that routing loops do not occur and send the packet back to the router with the unavailable link because it would have been in the shortest path of an intermediate router. A tunneling technique is provided that maximizes the levels of encapsulation needed at two, regardless of the size or configuration of the network. An unavailable link is not broadcast immediately throughout the network, giving the link an opportunity to be restored before all of the routers are called on to recalculate the shortest paths and alternate paths. During a short interval following the discovery of an unavailable link, then, a router connected to that link is in a state identified as the Use Alternate Path state, and the link is repeatedly checked for availability. Each router calculates and stores the alternative paths to each other router after first calculating the shortest path to each other router. The alternate paths are pulled up and used when an unavailable link is detected. Dijkstra's algorithm is used to calculate the shortest paths. A new algorithm called the iterative dynamic Dijkstra's algorithm is used to calculate the alternative routes.

25 Claims, 15 Drawing Sheets

U.S. PATENT DOCUMENTS

| | | |
|---|---|---|
| 6,282,671 B1 | 8/2001 | Islam et al. |
| 6,286,038 B1 | 9/2001 | Reichmeyer et al. |
| 6,286,108 B1 | 9/2001 | Kamo et al. |
| 6,538,991 B1 * | 3/2003 | Kodialam et al. .......... 370/229 |
| 6,901,048 B1 * | 5/2005 | Wang et al. ................ 370/228 |
| 2002/0004843 A1 * | 1/2002 | Anderson et al. .......... 709/238 |
| 2002/0093954 A1 * | 7/2002 | Weil et al. .................. 370/389 |
| 2002/0167898 A1 * | 11/2002 | Thang et al. ............... 370/216 |

OTHER PUBLICATIONS

Laboritz, et al., (1997), ACM, "Internet Routing Instability," pp. 115-126.

McQuillan, et al., (1979) Computer Communication Review, "An Overview of the New Routing Algorithm for the Arpanet," pp. 1-7.

Perlman, et al., (1988), ACM, "Pitfalls in the Design of Distributed Routing Algorithms," pp. 43-54.

Narvaez, et al., (1999), ISCOM, "Efficient Algorithms for Mult-Path Link-State Routing."

* cited by examiner

Sample network for alternate path calculation

Shortest Path Tree of Node A

New Shortest Path Tree of Node A

Invalid Set for first iteration

Invalid Set for second iteration

Invalid Set for third iteration

Ring Network

Original IP packet

Encapsulated IP packet

Scenario depicting Case 1

IP packet with one extra level of encapsulation

IP packet after decapsulation

Scenario depicting Case 2

IP packet with two extra levels of encapsulation

IP packet after 1 level of decapsulation

IP packet after both extra headers are removed

Interface State Machine

Neighbor State Machine

Re-Route State Machine

Test Network

AGILE DIGITAL COMMUNICATION NETWORK WITH RAPID REROUTING

CROSS REFERENCE TO RELATED APPLICATIONS

Priority is claimed from U.S. provisional patent application Ser. No. 60/336,330 entitled "Wireless Storage and Supporting Agile Network" filed Nov. 2, 2001 in the name of Yu Ngai Hui and Bernard M. Van Emden. That application is incorporated herein by reference.

BACKGROUND OF THE INVENTION

The present invention relates to digital communications networks and, more particularly, to a self-reconfiguring digital mesh communications network communicating between user devices (such as servers or other computers) and storage or other subordinate devices. Conventional computer networks or systems are generally hierarchically connected and communicate through a HUB or switch architecture. A drawback of HUB or switch architectures is that they suffer bandwidth degradation due to the back plane speed of the HUB or switch.

In IP networks routers provide, inter alia, the functionality of forwarding packets. More often than not, they are responsible for forwarding the packets to the next hop router only. This, they do independent of other routers. The network topology information is exchanged between them, which facilitates the construction of routing tables. Tables in each router specify the next hop to reach a particular destination.

The way in which the elements of a network are connected is called network topology. All routers have to reconstruct their routing tables for forwarding to work correctly if there are any changes in the network topology. Routing tables are constructed taking the network topology as the input. The shortest paths to all destinations are calculated and the next hop for each destination is stored in the routing tables. This requires that all routers be apprised of every change in the topology. Both link failure and re-establishment are such changes in the network topology. If a link goes down, the routers connected to that link stop using that link to forward packets. Other routers, which are not aware that the link is not functional, could continue sending packets to the routers connected to the failed link. Hence, every router in the network has to be informed about the link having gone down. A link state advertisement (LSA) to every router in the network advises of the new topology. This is called "flooding." The period during which this information exchange is taking place from the time the link failed until the time when all routers have rebuilt their routing tables is called convergence period. During this period there may be transient routing loops. Also, its portion of the conversion period each router ceases communication. Packets are buffered by each router until it perceives that the convergence period is over. For efficient performance this interval must be as short as possible. As the network size increases, the frequency of link state changes increases, and the convergence period increases since more routers have to be informed and all of them need to do the recalculation of their routing table. In terms of bandwidth and processing cost, the overhead associated with flooding is greatly increased. Also, very frequent changes in the link state degrade the overall network performance and sometimes make it impossible for routing to take place correctly because of instability and route flapping—the condition in which numerous routes are withdrawn and re-advertised in rapid succession. Still, a quick response to link failures, lower convergence periods and less control traffic are desirable for good networks and to enable providing Quality of Service (QoS).

In today's Internet, one routing technology, dominated by link state routing protocols, is Open Shortest Path First (OSPF). It is based on the Shortest Path First algorithm known as Dijkstra's algorithm. The protocol calls for sending the LSA packets to all routers in the same hierarchical area. The LSA contains information about a router's attached interfaces, their metrics and other variables like the other end of the interfaces etc. All routers collect these LSAs and use them to form a table called the Link State Database. This link state database is the input to the shortest path algorithm, which calculates the shortest path to all other nodes in the network. With this calculation, the routing tables are generated and are used for routing packets in the network.

There are several advantages of link state protocols over distance vector protocols. However, the deficiencies include slow response to topological changes, large update packets that interfere with data traffic, and a tendency to form loops, which could sometimes persist for seconds or even minutes.

A topology in which there are at least two nodes with two or more paths between them is called mesh topology. In a mesh topology, the nodes of the network are connected by point-to-point links. FIG. 3 is an illustration of a mesh network with multiple links (A, B), (A, C), (A, D), (B, E), etc. connecting the multiple nodes A, B, C, D, E, etc. A ring network as illustrated in FIG. 10 is a special case of a mesh network. In the networks described here the nodes are routers. The routers may be communication devices dedicated to the routing and rerouting of communications, or they may be other devices having this functionality, i.e. PCs appropriately programmed.

Many companies are developing products to create wireless mesh broadband networks. The Nokia Rooftop Wireless routing mesh network solution [10] is one such product. Products like this enable delivery of broadband services to residential and small business customers. They do not depend on the existing copper lines or fiber optics. The intention is to provide coverage to an entire neighborhood which could be laden with obstacles like trees, poles, hills etc.

Each node in such a network is both subscriber equipment and a router. The Nokia product uses a proprietary operating system called the Nokia AIR OS. It also includes a specialized set of networking protocols for adaptive multi-hop wireless networks. The network planning has to be done in such a manner that multiple paths exist between nodes in the network. The routing protocols have to be made robust enough to handle link failures and switch to alternate paths whenever required. Added to this, the paths chosen by a router at any point in time must be the best available paths. The objective is to achieve a self-forming self-healing scalable network. The routers in the network have to make smart routing decisions, routing around obstacles and taking care of link failures to provide seamless service.

In the case of wireless networks operating on link state routing protocols, another serious problem is encountered. Because the wireless links are fragile, the use of link state protocols in their current form give a very poor performance. For this reason, wireless networks are not often used to communicate among computers and storage facilities. The frequent link failure requires too much control traffic. This degrades performance. For example, where a passing object in the line of sight will be mistaken for a link failure it will trigger multiple link state updates in an area in which the object is moving. The coming up of the link will also have to be advertised by flooding. The amount of traffic generated by this flooding can become tremendous and severely degrade the network performance. The principle behind link state protocols is that for routing to work correctly, all routers in the network must have identical topological information at all times. Even if there is a single change in the link state of the network, the information is propagated immediately to the entire network. This is because of the distributed replicated database model [1] followed. In sum, then, flooding the entire area because of a single change can be expensive in terms of time, bandwidth, cost and computational overhead and the problem gets worse when the links go up and down rapidly. Also routing instability that comes about in the form of routing loops can become unacceptable.

In the specific case of wireless links, there is an even more serious problem. Every router has a parameter called "MinLSInterval" [1] [4] [11] [12]. The value of this parameter sets the interval, in seconds, between distinct originations of any particular link state advertisement packet. If the value is set to 5 seconds, a router cannot send two consecutive updates about the same interface more frequently than 5 seconds apart. If a link goes down and the router has advertised the failure, it cannot advertise the coming up of the link for the next 5 seconds even if the link comes back up within a few milliseconds. Therefore the link is rendered unusable for some time even if the link is up. The reverse of this occurrence is worse. If a link is advertised to be up, but goes down in a few milliseconds from the advertisement and does not come back up for some time, then routing loops can occur. This is because all the routers in the network do their calculations based on the fact that the link is up, which is not true. All this coupled with the standard problem of huge amounts of flooding traffic makes a serious problem.

One approach to this problem that is followed is that changes in a link's metric are ignored and the information is not propagated [6]. Routing takes place along old routes in a sub-optimal manner. Once every few seconds, the router can send a summary of all the changes that have taken place. This reduces the amount of control traffic in the network, but this approach fails when the change in the link state is a link failure. This information cannot be withheld because it will cause routing loops and packet loss. This requires that the information about link failures must absolutely be flooded for protocol correctness.

Another related issue is link failure detection. There are two approaches possible. One is the routing protocol itself monitors the link and detects link failures. The other is to leave the lower layers (like the data link layer) do the job and inform the IP layer of the link state changes. The latter method is better because it leads to quick detection compared to the former. When OSPF is used, a "hello protocol" [1] [4] [11] [12] is used to determine the link's state. The protocol ensures that communication between two neighbor routers is bi-directional. Hello packets are sent out periodically on all router interfaces. When a router sees itself listed in its neighbor's hello packet, bi-directional communication is ensured. A parameter called the "RouterDeadInterval" [1] [4] [11] [12] with a typical value of 40 seconds is configured for every interface. When a hello packet is not received on an interface for four consecutive "HelloIntervals" (typically 10 seconds each), the router declares the link to be down. After the first interval elapses without the reception of a hello packet on a link, a timer triggers for that link to keep track until four such intervals elapse. During this time, the router has not yet declared the link down, so it assumes that the link is fine and uses the link to route packets. If the link is actually down, then the packets, which are transmitted on that link during this time, are lost. They have to be retransmitted by higher layers, or they cannot be recovered. But if the lower layers quickly detect the link to be down, this can be taken care of. The link can be declared down immediately and the usage of the link can be stopped. The routing protocol should be the last resort for link state detection, when all else fails. If it is used as the primary means, it could lead to many packets lost or retransmitted.

Link state restoration algorithms have been proposed in the past [6] [8] [16] [17] [18]. Various schemes are employed to restore failed links in networks running link state routing protocols. Some of the schemes concentrate on fast flooding of link state information for faster convergence [8]. The approach used by many people is to route around the failed link and to get to the other end [16] [18]. The process involves finding an alternate path to the other end of the link and tunneling the packets to the node at the other end, using the alternate path. This scheme has been proved bad as it causes transient routing loops and is quite inefficient.

A few schemes propose the use of special packets in the network, to inform only a few routers along the restoration path about the link failure [6]. These are called branch update algorithms and give a better performance compared to the ones discussed above. The overhead associated with this approach is the definition of new packet types, their structures, functions and protocols for their use. Vector metric algorithms [6] are also in use, wherein the link metrics are defined as vectors instead of the standard scalar link weights.

The procedure by which Link State Advertisements are sent out to the entire routing domain is called Reliable Flooding [1]. When a router's local state changes, it creates a Link State Update packet within which is a Link State Advertisement. The router then sends out this packet on all of its attached interfaces. This is the beginning of reliable flooding. The router's neighbor on receiving the Link State Update packet does the following:

- The Link State Advertisement (LSA) within the Link State Update packet is examined for the correct type and as being the most recent one.
- The LSA is installed in the Link State Database 91 in FIG. 1a.
- An acknowledgement is sent to the router that sent the packet.
- The LSA is re-packaged into a new Link State Update packet and sent out on all the interfaces except for the one on which the packet was received.

The process continues until all the routers have the new updated LSA.

All initiators of LSAs need to refresh their LSAs every 30 minutes. This period is called "LSRefreshTime" [4] [11] [12] and is a constant. The sequence number of the LSA is incremented and they are re-flooded throughout the routing domain. A checksum is used to detect errors in an LSA. OSPF has a restriction on the frequency at which an LSA can be generated. An interval called MinLSInterval that is set to 5 seconds is the minimum time that a router must wait before sending out an updated LSA. A rapidly changing network element, for example a link between two routers going up and down continuously can cause a lot of control traffic and deteriorate the performance of the network. The MinLSInterval is configured to guard against this problem.

A second level of protection is used for routers that refuse to respect the MinLSInterval and send out Link State Update packets very rapidly. An OSPF router will not accept an updated LSA if the current copy that it has in its Link State Database table is less than 1 second old. A neighbor on receiving such Link State Update packets will discard them and they are never sent into the network. Assuming that all the routers in the network respect the MinLSInterval, it becomes apparent that there will be routing problems in terms of dropped packets when a link goes down in less than five seconds after coming up. When the transport protocol is UDP, these packets are just lost. On the other hand TCP will handle the re-transmission of dropped packets. Also, the flooding procedure though efficient takes time which increases with the size of the network. The convergence period is the duration from the time the flooding procedure begins to the time when all the routers have the updated information and have completed the re-calculation of their routing tables. Although this period is short, during this period there will be dropped packets and transient routing loops. Routers in, the network, which are not yet updated about the information that a link has gone down, continue to use their previously calculated routes. OSPF is one of the better protocols in terms of having a short convergence period and a very efficient flooding mechanism. However with fragile links, the protocol in its current form has limitations.

SUMMARY OF THE INVENTION

In accordance with this invention, an agile (i.e. rapidly self-reconfigured) network is provided. It can be used for digital communication between servers or other computers originating communications (sometimes generically called "initiators") and storage devices or other devices to and from which communications are sent in support of the initiators (sometimes generically called "targets"). The network of the present invention is a high availability redundant network capable of high-speed communication and agile reconfiguration to accommodate network conditions. The network is designed to deal with the unique characteristics of wireless communication, which, in the absence of its unique software, would exhibit a lower reliability. Because redundant paths and an ability to switch paths in a matter of milliseconds are provided, reliability is increased. The network also exhibits an apparent data delivery bandwidth that can greatly exceed the individual link bandwidth (usually in excess of 1 Gbps). This is due to the redundant paths. The redundant paths of this mesh network means that different devices can communicate simultaneously over different links in the network not limited by the back plane speed of a HUB or switch and the use of duplex communication channels.

The agile reconfiguration to accommodate network conditions that is afforded by the rapid path switching capability enable the network of the invention to be reliably realized using wireless links, despite their lower reliability. However, the inventive methods and apparatus described herein improve hard-wired fiber optics networks as well.

A preferred embodiment of this invention connects, via the network storage facilities, (as the "targets") to application servers (as the "initiators"). Such a network-connected storage system can afford any number of the following desirable features:

1. Soft assignment of disks or disk slices to users (server computers) that can be easily changed by an operator from a control console.

2. Virtual control console in which all computers in the system, with proper security controls, can request or release storage resources.

3. Disk mirroring without the use of server resources.

4. Disk backup without the use of server resources.

5. RAID implementation.

6. Mirroring pause and resynchronization.

7. Performance improvement by response to some SCSI communication from the local router rather than end-to-end. End-to-end response is only required for data delivery from server to disk or from disk to server.

8. Increased server to disk bandwidth due to availability of multiple paths, use of meshed network (full or partial), full duplex communication and communication over different links of the network simultaneously without contention.

9. High availability due to minimization of single points of failure and availability of multiple paths between any source and destination.

10. Implementation with a low initial cost using a scaleable architecture.

11. Elimination of cable infrastructure between users (servers) and storage resources (disk, tape, CD, etc.).

In accordance with one aspect of the present invention, the basic problem of using fragile links in a network running link state protocols is overcome, based on the use of two techniques, first, pre-calculated alternate paths, and second, a unique IP tunneling. Tunneling, means encapsulating an IP packet within one or more headers and removing the headers at one or more routers along a path when the alternate path is used. Minimum and maximum levels of encapsulation needed for alternate path routing are used. A state machine is provided which gives the protocol for handling link failures by using the pre-calculated alternate paths and the IP tunneling.

The method and system of the invention provide reduced flooding traffic in the network and rapid rerouting in the presence of short duration link failures. Loop free routing is ensured. Reduced control traffic and less packet loss in the network is accomplished. In one preferred embodiment, the invention was implemented on a network of Linux routers.

The state machine addresses the problems of fragile links in an OSPF network. The main objective is to see to it that packet forwarding is not affected when a link goes down and comes back up in less time than the MinLSInterval. During this time, the router uses pre-calculated alternate paths and the tunneling mechanism to forward packets. A second objective is to reduce flooding because of fragile links.

This invention, in a preferred embodiment, handles single link failures in an IP network of routers running link state routing protocols such as Open Shortest Path First (OSPF). The present invention provides for handling extremely short duration link failures in a network. According to this scheme, ephemeral link failures are not advertised, and an IP tunneling mechanism is used to forward packets along pre-calculated alternate paths such that routing continues uninterrupted. The alternate paths for destinations affected by a link failure are calculated using dynamic Dijkstra's algorithm run in an iterative manner. Irrespective of the size of the network, a maximum of two levels of encapsulation is needed for tunneling packets from any source node to any destination. An aspect of this invention is the determination whether one or two encapsulations will assure successful rerouting.

Network administrators believe in the philosophy that bad news must be propagated immediately but good news can wait. The reason is that when a link goes down, the information must be flooded immediately because routing cannot be done anymore using that interface. But when a link comes back up, the information must wait till the link is up and stable for a good amount of time to be sure that it can be used for routing and that it will not go down again soon. The lower layer protocols are designed such that they inform the higher layers about a link failure instantly. But on link restoration they wait a certain period before informing the higher layers.

The present invention adopts a new philosophy: "even bad news can wait if it is transient." Packet forwarding is handled locally during the short period of time during which the bad news comes and goes. There is no need to announce a link failure if the link will not remain down for a good amount of time. Particularly since the capability of announcing the link having come up has been removed for at least 5 seconds after the failure. But if the link failure sustains for a good amount of time, it must be announced. How long the information must be concealed and packets routed through the alternate path, is left to the network administrator. One way to accomplish re-routing is directed by the Re-Route State Machine. Implementation of the Re-Route State Machine can vary by configuring different timers. The choice depends upon the particular network under consideration and the reliability of links in the network.

A prototype of the invention was developed and tested on a network of Linux routers, running the OSPF routing protocol. An algorithm for handling link failures was developed in the form of the above-mentioned state machine. A link failure scenario was created, and rapid re-routing of IP packets was tested. The objective is to minimize control traffic and ensure loop free routing. Also, the scheme can be effectively used to take care of congested links in a network, avoiding buffering of IP packets and providing Quality of Service.

Thus, in accordance with the present invention, improved mesh network and network operation are provided, defining additional packet types has been avoided, and scalar link metrics are used, which are standard. Router operation in accordance with the techniques of the invention are provided by implementing software, and improved routers running software to effect the network operations according to the invention are provided. The operation of an existing routing protocol is left undisturbed and the link failures are handled separately using the existing packet types and structures.

The above and further objects and advantages of the invention will be better understood from the following detailed description of at least one preferred embodiment of the invention, taken in consideration with the accompanying drawings.

DETAILED DESCRIPTION

Figure 1:
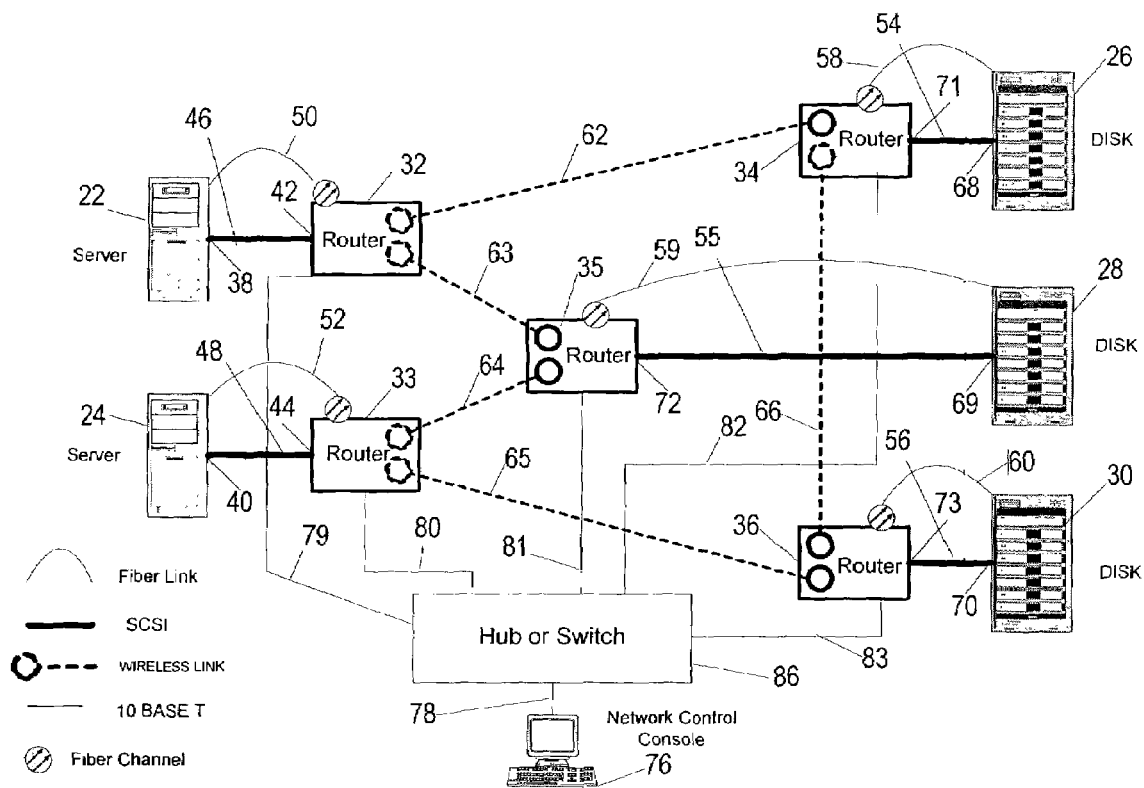
FIG. 1 is a functional block diagram illustrating an agile supporting storage network in accordance with one embodiment of the present invention.

Referring to FIG. 1, a network 20 connects two servers 22 and 24 to three cabinets of disks 26, 28 and 30 via five routers 32-36. The disks can be in a RAID (Redundant Array of Independent Discs) or JOBD (Just a Bunch of Disks) configuration. SCSI (Small Computer Systems Interface) ports 38 and 40 of the servers 22 and 24 are connected to the SCSI ports 42 and 44 of the network's routers. The ports 38 and 40 of the servers 22 and 24 can be connected by cable as illustrated at 46 and 48, or the servers can be connected to the routers using fiber channel as indicated at 50 and 52 or by IR, laser link or any convenient means. In addition, each cabinet of disks 26, 28 and 30 is connected to a router 34, 35 and 36 using an SCSI at 54, 55 and 56 or fiber channels 58, 59 and 60 or, again, any convenient means.

Each router is connected to each of two other routers by a link 62, 63, 64, 65 or 66. These links can be a copper wire, optical fiber, laser link 18 (as indicated in the preferred embodiment), RF link, microwave or any convenient, reliable communication link. There are two paths 46 and 48 from each server's SCSI output 38 or 40 to each disk cabinet SCSI input 68, 69 or 70.

Functions of the routers coupled to the server include, but are not limited to:

Emulating all of the disks or disk slices designated as being attached to the server;

Encapsulating the SCSI communication into IP packets;

Forwarding the packets to the router connected to the target disk (or slice);

Forwarding packets intended for other routers along the path to that router; choosing the path for packet delivery;

Changing the delivery path depending on link availability, traffic or type of service criteria providing the necessary, rapid configuration agility; and Returning packetized SCSI communications to the originating SCSI port.

The routers attached to the disk cabinets have the same functionality except instead of emulating all of the disks or disk slices logically attached to the server it acts as an initiator on the SCSI port 71, 72 or 73 (or fiber channel 58, 59 or 60) actually driving each of the attached devices 26, 28 and 30. While SCSI communications are mentioned, this is exemplary only. Fiber channel; iSCSI, Infiniband, ATA, serial ATA and other communications protocols are suitable for use in accordance with the invention, without limitation.

The entire system is monitored by software on a control console 76 that can communicate with each of the routers out of band using Ethernet links 78-83. If necessary, the control network can be implemented using a hub or switch 86. It is also possible to connect the control console using in band connections. In that case, the console is connected directly to one or more of the routers. The control console then communicates with the routers via the routers and their links.

Additionally, functionality such as disk backup without the involvement of the servers, disk mirroring, etc. may be added under the control of the network console 76. The storage facilities shown as disk cabinets can be any device that can be attached to a SCSI bus such as disc, CD, DVD, WORM, CD-R, CD-RW, tape, juke box, etc. Although the sole figure illustrates two servers, five routers and three cabinets of disks, this is obviously not a limitation of the present invention. There may be many more or fewer than five routers, many more or fewer than three targets and more or fewer than two initiators.

Pre-Calculated Alternate Paths

The prior art teaches that when a link in a network of OSPF routers goes down or becomes unavailable, the information about the link failure is propagated by the nodes that are connected by that link to all the other nodes in the network. All the routers in the network then discard the old routing table and recalculate a new Shortest Path Tree (SPT) after incorporating the new information in their link state databases [5]. As a result of this computation, new paths are found to some nodes in the network because of the topology change. However, paths to some nodes are recalculated but remain unaffected. For each node, a new routing table is subsequently built using the new SPT.

Prior work done on this calculation of the new SPT [19] proves this to be an inefficient method because of unnecessary computational overhead. First, as noted, not all the nodes in the network are affected by a link failure. Second, the old shortest path tree is just discarded, and the information there is not used for the computation of the new SPT. The fact that the link failure does not affect all the nodes in the network is very important because new paths need to be found only for the affected nodes. A set of new algorithms collectively called "dynamic" algorithms has been defined in literature [7] [19] that makes use of this fact. In the calculation of alternate paths, it becomes necessary to use these algorithms.

In accordance with this invention, after a node runs the Dijkstra's algorithm to calculate the shortest path to all other nodes in the network, it immediately calculates an alternate path also to every other node for each possible link failure. This, then, is a proactive approach to deal with link failures. The three necessary conditions for an alternate path to exist are:

A. All the nodes in the network must have more than one active interface. That is to say there must be at least two or more active links connected to a node. This becomes essential because if one link connected to the node fails, there must be at least one other link for the node to be connected to the network.

Figure 2:
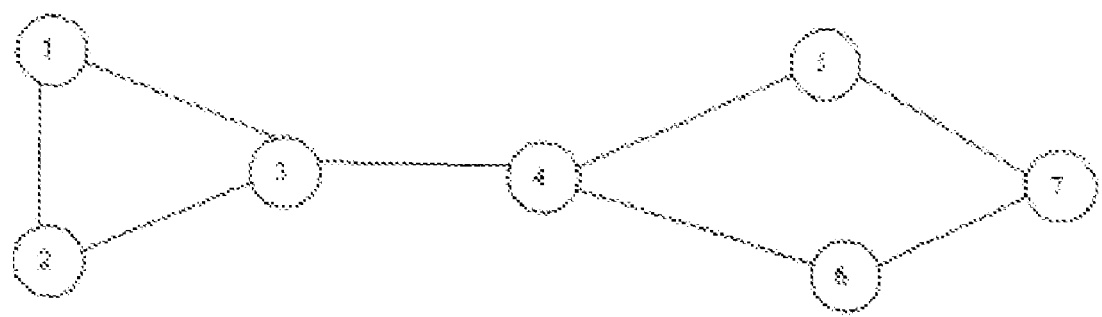
FIG. 2 is a diagrammatic illustration of a network other than that of the invention for purposes of explanation.

B. The mesh topology should be such that it does not create "islands" when one link in the network fails. A node may have two links going out from two of its interfaces, but when one link fails, it could so happen that one set of nodes becomes disconnected from another set creating two islands in the network. This is a result of bad network design and such situations cannot be handled. FIG. 2 depicts one such network. When the link between the nodes 3 and 4 fails, two islands are created and the network is disconnected. Such link failures cannot be handled.

C. All links in the network are bi-directional. This means that for a node, there are no separate incoming and outgoing links. All links associated with a node are both incoming and outgoing.

In addition to the above conditions, the networks dealt with here have symmetrical link weights. This means that a link in the network has one "cost" associated with it for both directions. This is a condition that is imposed on the network for the proposed algorithm. Why this is needed will become apparent when IP tunneling is discussed below. In the case of networks with directed links and different costs associated for the two directions of the link, this algorithm may not work.

Properties of the Alternate Path

The alternate path to a node must be disjointed or separate from the shortest path to that node at least on its first hop, i.e. its first link to another node. Note the two paths, the shortest and the alternate need not be completely edge disjointed. It is however essential that the first hop of the two paths be different. The alternate path calculated for a node should be such that if the first link on the shortest path to the node had failed, then this path would have been the new shortest path as calculated by Dijkstra's algorithm. In other words, the alternate path to the node is the new shortest path to the same node when the first link on the current shortest path fails. The alternate path should not be mistaken as the second shortest path. There can be many paths to the same node. This alternate path is the shortest path to the node that is edge disjoint on its first hop from the actual shortest path.

There can be some nodes in the network, which have multiple equal cost shortest paths. OSPF records all such routes and the packets to the destination are sent on one or the other path depending on the way the network has been configured. Multiple paths can be used to split the traffic to the destination and even policy routing [20] can be employed. The alternate path for such nodes is one of the shortest paths depending on which shortest path is used in the initial calculation of the shortest path. The cost of both the shortest and alternate paths are the same in this case. The alternate path is always calculated immediately after the shortest path computation.

Shortest Path vs. Alternate Path

The notations used by Bertsekas and Gallagher are followed here [2].

Briefly, a network is represented in the form of a graph G=(N, A). N is a set of nodes and A is a collection of distinct node pairs from N, each called an arc. Since undirected networks are being discussed, an arc $(n_1, n_2)$ is incident on both $n_1$ and $n_2$. The arcs do not have arrows, as they are not directed. There are no duplicate arcs between the same pairs of nodes. A sequence of nodes $(n_1, n_2, \ldots, n_k)$ such that each of the pairs $(n_1, n_2), (n_2, n_3) \ldots (n_{(k-1)}, n_k)$ are arcs of G is called a walk. A walk with no repeated nodes is called a path. A walk $(n_1, \ldots, n_k)$ with $n_1=n_k$, k>3 and no repeated nodes other than $n_1=n_k$ is called a cycle. The graph is called connected if there is a path from every node to every other node. The connectivity property is formally given by the following lemma.

Let G be a connected graph and let S be a non-empty strict subset of the set of nodes N. Then at least one arc (i, j) exists with i∈S and j∉S. A tree is a connected graph that contains no cycles. A spanning tree of a graph G is a sub-graph of G that is a tree and that includes all the nodes of G. Consider a connected graph G=(N, A) with N nodes and A arcs and each arc (i, j)∈A has a weight $W_{ij}$ associated with it. A minimum weight spanning tree (MST) is a spanning tree with minimum sum of arc weights. The cost of sending a message along an arc in either direction is given by the arc weight. In our undirected graph with a path p=(i, j, k, . . . , l, m, the length (or cost) of the path p is defined as the sum of the weights of arcs (i, j), (j, k) . . . (l, m) i.e. $W_{ij}$+ $W_{jk}$+ . . . + $W_{lm}$. Given any two nodes (i, m) of the graph, the shortest path problem is to find the minimum length (cost) directed path from i to m. The shortest path is the minimum cost path over which data can be sent from i to m. A collection of unique shortest paths from a node (called the root node) to all other nodes in the network forms a tree called the shortest path tree for the particular root node. Herein, "node" and "router" are used interchangeably, as are "link" and "arc." The "coming up" of a link means the link becoming operational from a non-operational state. The "going down" of a link means the reverse. An operational link is "up" while a non-operational link is considered "down." The cost and length of a path mean the same.

Dijkstra's Algorithm for Shortest Path Tree Generation

The Dijkstra's algorithm gives the procedure for calculating the shortest path tree. See [5]. Dijkstra's algorithm requires all the arc weights to be non-negative. The explanation of the algorithm is presented as in [11], because it is specific to Open Shortest Path First. The details of the structures are omitted for simplicity. The working of the algorithm with respect to the construction of the shortest path tree and the routing table follows. The calculating router is called "root node" and it maintains a list of nodes (or vertices) called "candidate vertices." The steps of the algorithm are as follows:

1. Initialize the shortest path tree to only the root node i.e. the calculating node adds itself to the shortest path tree. The list of candidate vertices is initialized as empty.

2. The vertex just added to the tree is called vertex V. Examine the link state advertisement (LSA) associated with vertex V. Each link described in the LSA gives the cost of the link to the adjacent vertex (a neighbor of vertex V). For each described link (say it joins vertex V to vertex W):

If the vertex W is already on the shortest path tree, examine the next link in the advertisement. Otherwise calculate D, the cost from the root node to the node W, given by the sum of the link state cost of the already calculated shortest path to vertex V and the cost of the link between vertices V and W. If D is:

Greater than the value that appears for the vertex W on the candidate list, then examine the next link.

Equal to the value that appears for the vertex W on the candidate list, then calculate the set of next hops that result from using the advertised link. The next hop calculation takes the destination W and its parent vertex V as the input. The next calculation is explained below under that title.

Less than the cost that appears for the vertex W on the candidate list or if the node does not appear on the candidate list, then include the node W on the candidate list indicating a distance of D from the root node. Also calculate the next hop values that result from using the advertised link. Get the next hop values for W.

3. If at this stage, the candidate list is empty, then the shortest path tree has been completely built and the procedure terminates. If not, choose the vertex that is closest to the root from the list of candidate vertices and add that vertex to the shortest path tree. By closest is meant the vertex with the least cost path from the calculating node. At the same time, that vertex is removed from the list of candidate vertices.

4. Iterate the algorithm by returning to step 2.

Next Hop Calculation

The next hop for a node consists of the interface to use when forwarding packets to the destination (node) together with the next hop router if any. The next hop calculation for a node may be invoked several times while running the algorithm. Each time a shorter path is found to the destination than one that already exists, the next hop needs to be re-calculated. At the end of the algorithm, the final shortest paths to all nodes in the network are found. The next hop calculation takes the input as the destination node and its parent vertex in the current shortest path between the node and its destination. The parent vertex can be either the root node itself or another intervening router.

If the root node itself is the parent of the destination, the interface to choose is the interface connecting the root node and the destination. There is no next hop router in this case.

If the parent is an intervening router and not the root node, then the next hop for the destination is inherited from the parent's next hop. For a mesh network too one has only the interface and no next hop router. This is because different networks are not being configured. All the nodes are routers belonging to one area and forming one network.

This completes the description of the Dijkstra's algorithm. The explanation given has been outlined from [11] without too much detail about the data structures and has been condensed to explain the algorithm especially for mesh networks.

Sample Network, Shortest Path Tree and Alternate Path

Figure 3:
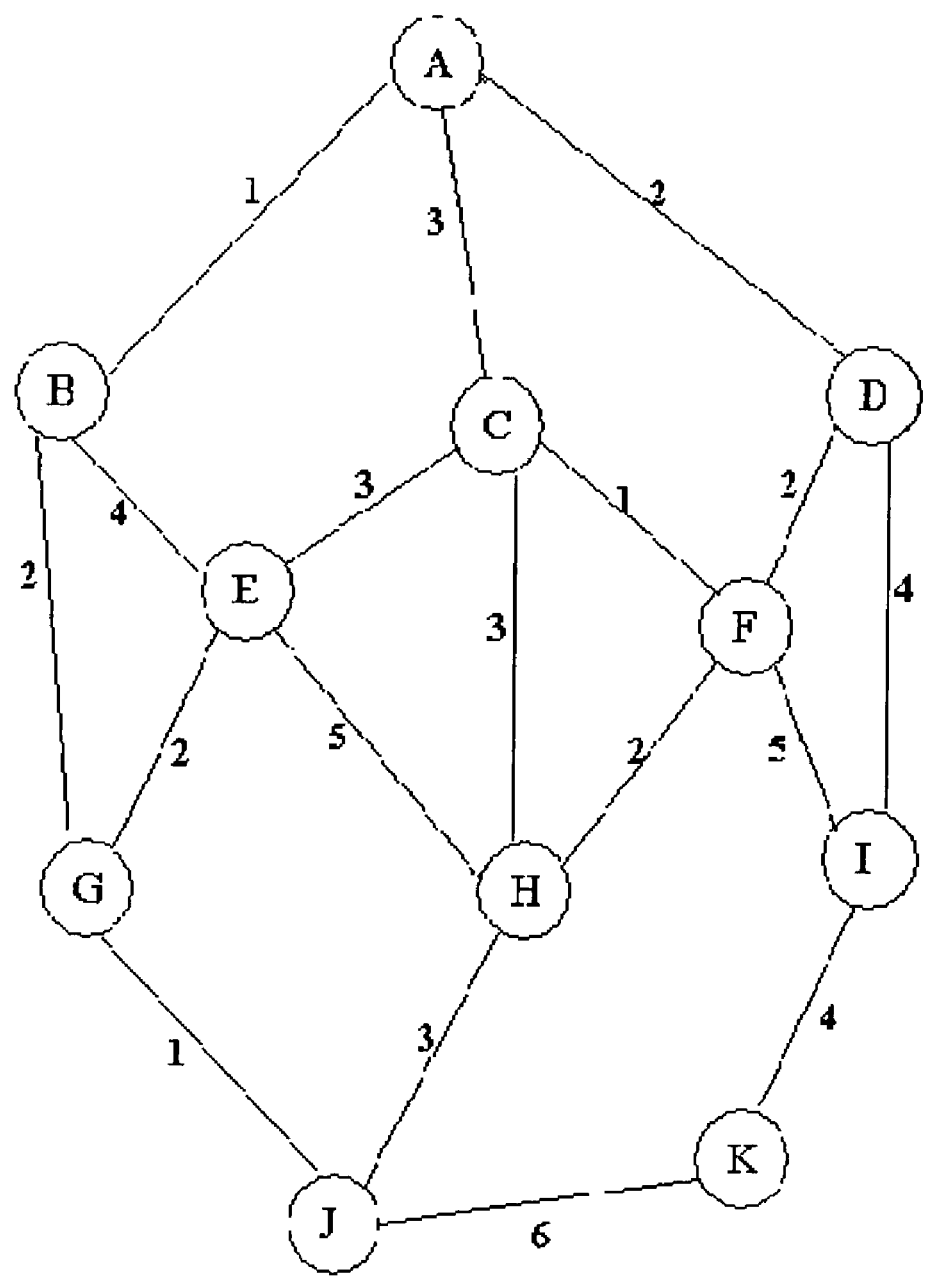
FIG. 3 is a diagrammatic illustration of a mesh network similar to mesh networks used in the practice of the invention.

FIG. 3 illustrates a sample network, used here to define the alternate path. There are 11 nodes (routers) in the network named A through K. The links (arcs) between the nodes are as shown. Every link in the network is bi-directional and the link weight is indicated next to the link. When the node A is the calculating router (root), it runs the Dijkstra's algorithm and generates a shortest path tree which contains the shortest paths from the node A to all other nodes in the network. The shortest path tree is as shown in the FIG. 4.

It is to be noted (from FIG. 3) that the nodes F, H and K have two equal cost shortest paths each. They are:
(A, C, F) and (A, D, F) for node F with cost 4.
(A, C, H) and (A, D, F, H) for node H with cost 6.
(A, D, I, K) and (A, B, G, J, K) for node K with cost 10.

Figure 5:
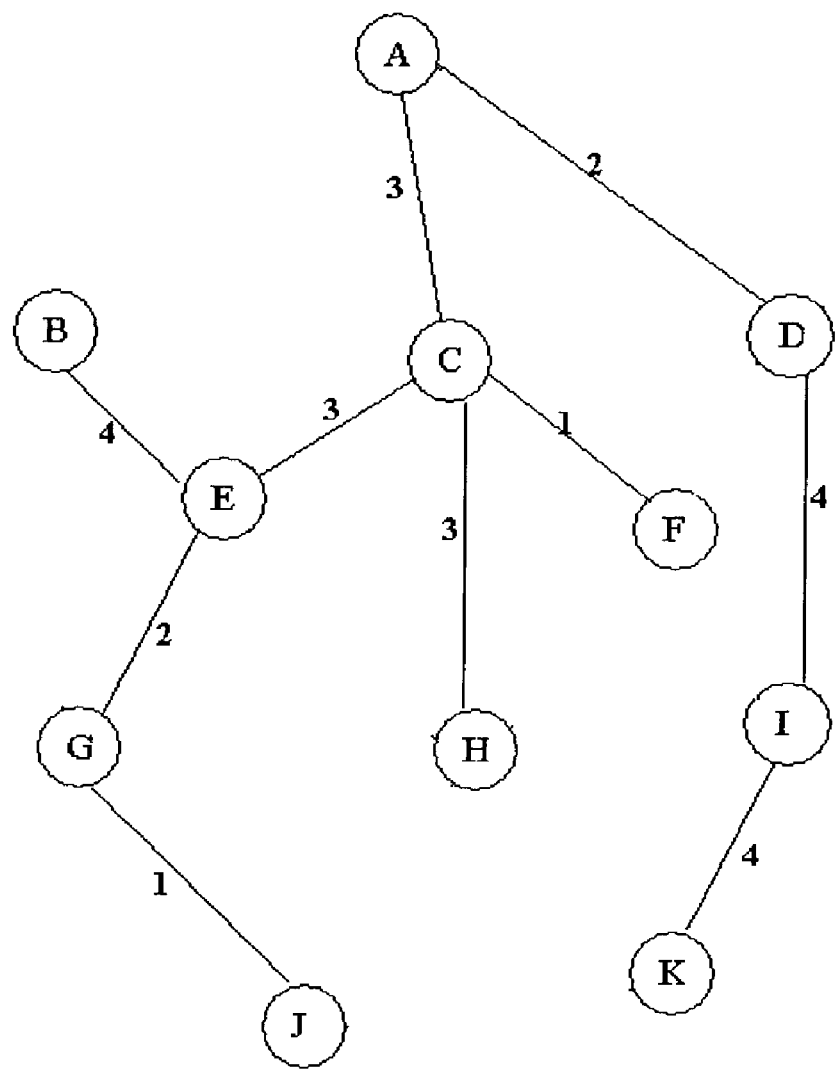
FIG. 5 is a new shortest path tree diagram of node A from node A, formed upon elimination of the link (A, B)

One of the paths will be used as the shortest path and the other will appear as the alternate path as will be shown in the illustration of the alternate path calculation. Should the link between the nodes A and B fail, the routers A and B start a flooding algorithm to announce the link failure to the entire network. Every router then discards its shortest path tree and re-runs the Dijkstra's algorithm recognizing that the link (A, B) has failed, producing a new shortest path tree. Like all other routers, router A also runs the Dijkstra's algorithm and the FIG. 5 shows the new shortest path tree created.

When the link between nodes A and B is up, the path (A, B, E), with cost 5, is the shortest path between A and E and path (A, C, E), with cost 6 when the link goes down. These two paths are totally disjointed. On the other hand between A and J paths are (A, B, G, J), with cost 4, and (A, C, E, G, J) with cost 9 when the link between A and B is up and down respectively. In this case the paths overlap on the link between G and J that is the last link on both the paths. The cost of a path is equal to the sum of the costs of the links on the path.

However, the first link of the two paths is different in both of the above cases. This is also true for all the nodes, which were initially being reached through B, but not anymore because of the link failure. The path (A, C, E) is the alternate path for node E from node A when the link (A, B) fails and (A, C, E, G, J), the alternate path for node J. With this example the definition of alternate path is completed.

Calculation of the Alternate Path Using Dynamic Dijkstra's Algorithm

Figure 1A:
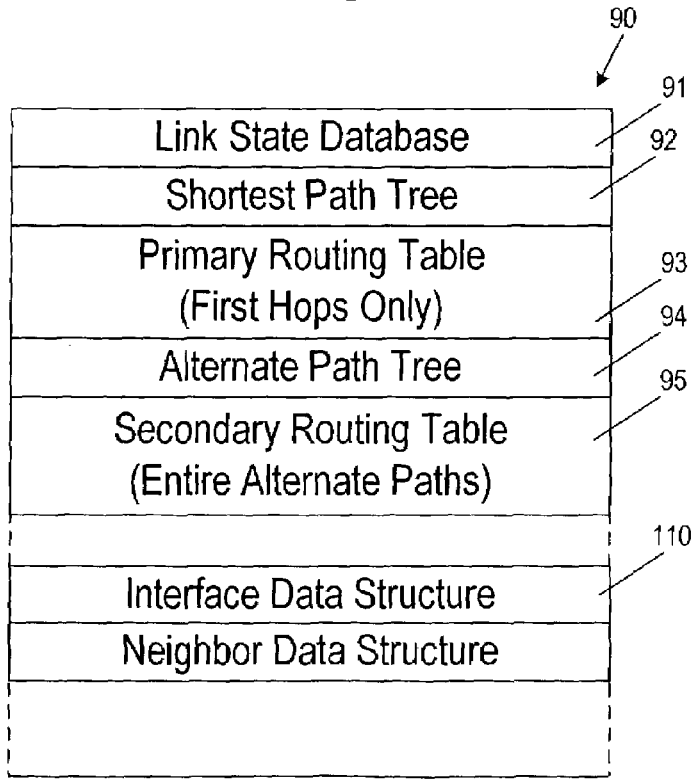
FIG. 1a is a partial memory map of a router serving as a node in a mesh network in accordance with the present invention.

Whenever a router gets an update about the topology of the network (or sends the update itself), it is incorporated into its link state database 91 (FIG. 1a). It discards the existing shortest path tree 91 (and the routing table 92). Routing functionality is stopped and packets are buffered. A recalculation of its shortest path tree 91 and routing table 92 is triggered. After the new routing table is created, the routing functionality resumes. Some researchers [19] felt that the old shortest path tree could aid in the calculation of the new shortest path tree. Erasing the previously calculated SPT and doing the calculation all over again can be more expensive than necessary in that routers' computational facilities are used and time is consumed in the calculating. Particularly when there is but a single change in the network topology, many sections of the existing SPT remain unaffected. This led to the discovery of a new set of algorithms called dynamic algorithms. The dynamic algorithm when used with Dijkstra's algorithm is called dynamic Dijkstra's algorithm. There are many variations of the dynamic algorithm. [7] gives the algorithms that exist and their complexities. Details of all those are not discussed, rather the basic idea is presented along with the reason why it is needed in this case and how it will be used.

When there is a change in the topology of the network, for example the weight of a link being changed or a link going down, etc., that change is propagated to all the nodes in the network in a link state advertisement. Normally the routers would update their link state databases 91, erase their present routing tables 93, recalculate the shortest path tree 92 and rebuild the routing table. In the new approach, they update their link state database tables and modify the shortest path tree by running the dynamic Dijkstra's algorithm. This helps to build the new routing table. A basic theoretical idea of the algorithm is presented as follows:

1. In the case of a link failure or other link unavailability, the nodes from which the link originates send a link state update packet to the entire network. The following steps are with respect to the root node (one of the nodes from which the link originates).

2. The root node then builds the set of nodes that become unreachable under the previously constructed shortest path tree of that node as a result of the link failure. This it does by looking into the present routing table. Any node for which the interface to be used is the interface on which the link has failed, will belong to this set. This set of nodes is called the Invalid Set. For example in the Shortest Path Tree of FIG. 4 if the link (A, B) is considered to have failed, then the Invalid Set will be [B E G J].

Figure 4:
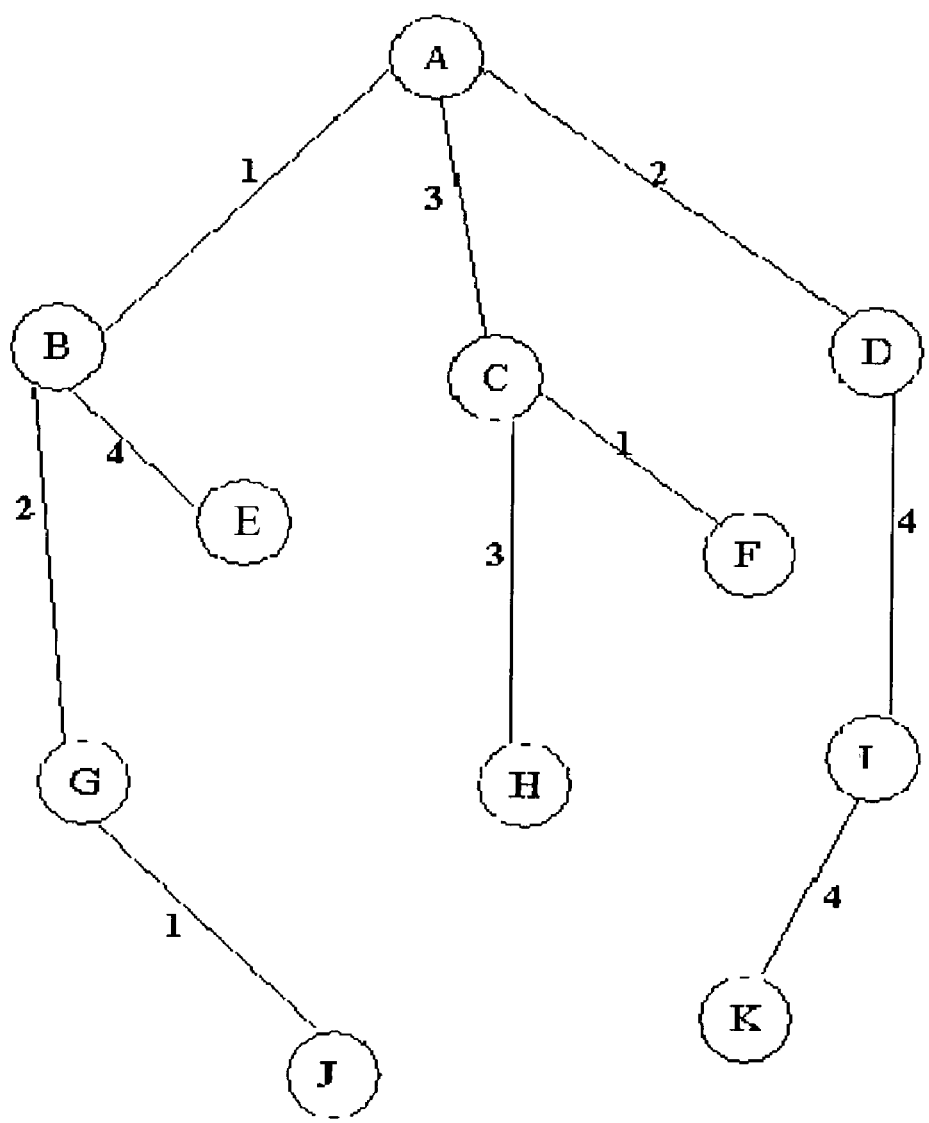
FIG. 4 is a shortest path tree diagram from node A of FIG. 3.

3. All the nodes of the Invalid Set are examined (by looking into the link state advertisements associated with them). If any node in the Invalid Set is directly connected to any node that is not in the Invalid Set, it is added into a new set called the Interface Set. In this step, the new set called the Interface Set is being created that is a subset of the Invalid Set. The nodes in the Interface Set have the property that they are directly connected to some node that is not in the Invalid Set. The idea is to create a subset of nodes that are reachable through other reachable nodes. In the example, returning to the mesh network topology as illustrated in FIG. 4, the Interface Set will be [E J] because these nodes are directly connected to nodes not in the Invalid Set ([C, H] among others).

4. Each node in the Interface Set is marked with a cost with which it can be reached through nodes that are not in the Invalid Set. Let the nodes that are not in the Invalid Set be called Outside Nodes. The cost for a node in the Interface Set is equal to the sum of two costs. They are the shortest path cost to the Outside Node and the cost of the link between the Outside Node and this node. For the example, node E is marked with cost 6, i.e. path (A, C, E), and node J with cost 9, i.e. path (A, C, H, J).

5. The node in the Interface Set with the least cost associated with it is added to the Shortest Path Tree and the set of next hops are calculated for that node. This node is removed from the Interface Set. It is node E for the example.

6. From this step onwards, the algorithm is the same as Dijkstra's algorithm from Step 2. thereof as described above. The Interface Set described here is the same as the candidate list in Dijkstra's algorithm.

Comparison with Static Dijkstra's Algorithm

As stated, the dynamic algorithm is the same as the static algorithm after step 6. Before that, the calculating router builds the set of nodes that become unreachable after the link failure, i.e. the Invalid Set. The subset of nodes from the Invalid Set reachable through other nodes (outside nodes), i.e. the Interface Set, form the interface to the reachable nodes. All other nodes in the Invalid Set will eventually become reachable through these nodes.

At this stage, step 6 begins and the Interface Set in this case is analogous to the candidate list in the static Dijkstra's algorithm [5]. From here onwards, the algorithms become the same. This is equivalent to running Dijkstra's static algorithm only on the nodes that have become unreachable because of a link failure. Since Dijkstra's algorithm is being run for fewer nodes when used dynamically, than the static case where it is run for all the nodes in the network, the complexity is less in the dynamic case. The computation time is obviously less and the procedure less expensive because the algorithm is not re-run for all the nodes in the network. The algorithm is only run as much as required. The complexity of the dynamic algorithm has been calculated in terms of the total number of comparisons made between the distances of two nodes and the total number of comparisons made between nodes in the Interface Set. It has been shown to be less than the complexity of the static algorithm [7]. There are some known variations of this algorithm [7] with differing complexities. These are called the first incremental algorithm; the second incremental algorithm etc. Use of such variations does not remove the method and system from spirit and scope of the present invention as described and claimed herein.

Since the dynamic algorithm produces the same results as the static version, which is well known, the correctness is implicit. The static algorithm has been proven to be correct [5].

Iterative Dynamic Dijkstra's Algorithm

In accordance with the present invention, the routers perform a pre-calculation of the alternate paths. Once a router constructs and stores the shortest path tree 92, it is ready for calculating the alternate paths to all the nodes. To do that, the nodes that will be affected when a particular link goes down are isolated. Then using the dynamic Dijkstra's algorithm, the alternate path to all these nodes can be found. The Shortest Path Tree is not reconstructed. Instead the alternate paths calculated will be saved in a secondary routing table 95 without modifying the primary table 93 calculated using the static algorithm. In addition to that there is a difference in the next hop calculation. While in the static algorithm, only the first hop is calculated and stored in the routing table, in the dynamic case, all the nodes that lead to the destination are saved. In other words, for every destination, the entire path to get to the destination is saved in the secondary routing table. This will be further modified, but at this stage, the entire path is stored.

The dynamic algorithm has been defined to create a new SPT from the old one with the new topology information. But since the dynamic algorithm is used to calculate an alternate path to all destinations, it needs to be run iteratively. That is here called the "iterative dynamic Dijkstra's algorithm." After the calculation of the SPT 92 by running the static algorithm, the router takes its first interface and assumes that the connecting link has gone down. The dynamic algorithm is run to calculate an alternate path for the nodes, which are affected should that link go down. Then the process repeats iteratively for all attached interfaces, assuming every time that the link connected with the interface in context has gone down. In this way an alternate path to all the nodes in the network is found. To summarize the differences between the normal operation of the dynamic algorithm and the manner in which the dynamic algorithm has been used here:

The dynamic algorithm is run when a link goes down. Here it is run assuming that a link has gone down.

The shortest path tree and routing table are modified in the dynamic algorithm. Here, a new routing table called the secondary table is constructed and the SPT and the primary routing table are not modified.

Only the first hop to a destination is stored in the dynamic algorithm. Here all the nodes in the path that lead to a destination are stored.

Here, the algorithm is run iteratively for every attached interface of the router, but normally it is run only once for the failed link.

At the end of the calculation, every router in the network has the following two tables:

A primary routing table 93 obtained by running static Dijkstra's algorithm indicating the interface to be used to forward packets to every node in the network.

A secondary routing table 95 having an alternate path to every node, stored in its entirety, obtained by running the iterative dynamic Dijkstra's algorithm.

ILLUSTRATIVE EXAMPLE

Figure 6:
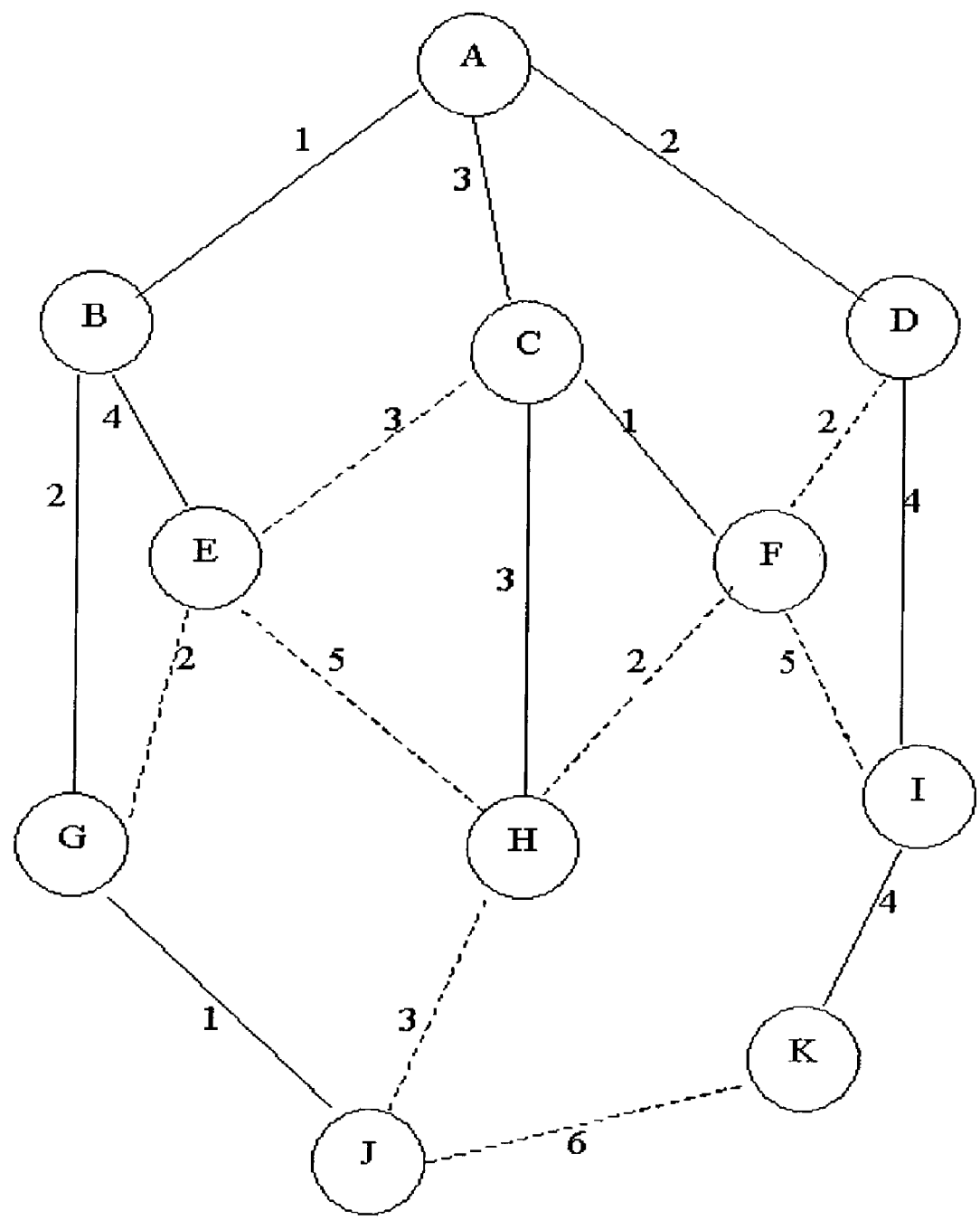
FIG. 6 is a further diagrammatic illustration of a network like that of FIG. 3 and shows those links that are available but are not part of the shortest path tree.

The same example as before (FIGS. 3-5) is used to explain how the iterative dynamic Dijkstra's algorithm works. FIG. 6 depicts in solid lines the Shortest Path Tree, from where this example starts. The dotted lines in the figure are not a part of the Shortest Path Tree. The root node is A and it has three interfaces with links (A, B), (A, C) and (A, D). The node A runs the iterative dynamic Dijkstra's algorithm for the three interfaces that are attached to it and finds an alternate path to all the nodes in the network as detailed below.

Figure 7:
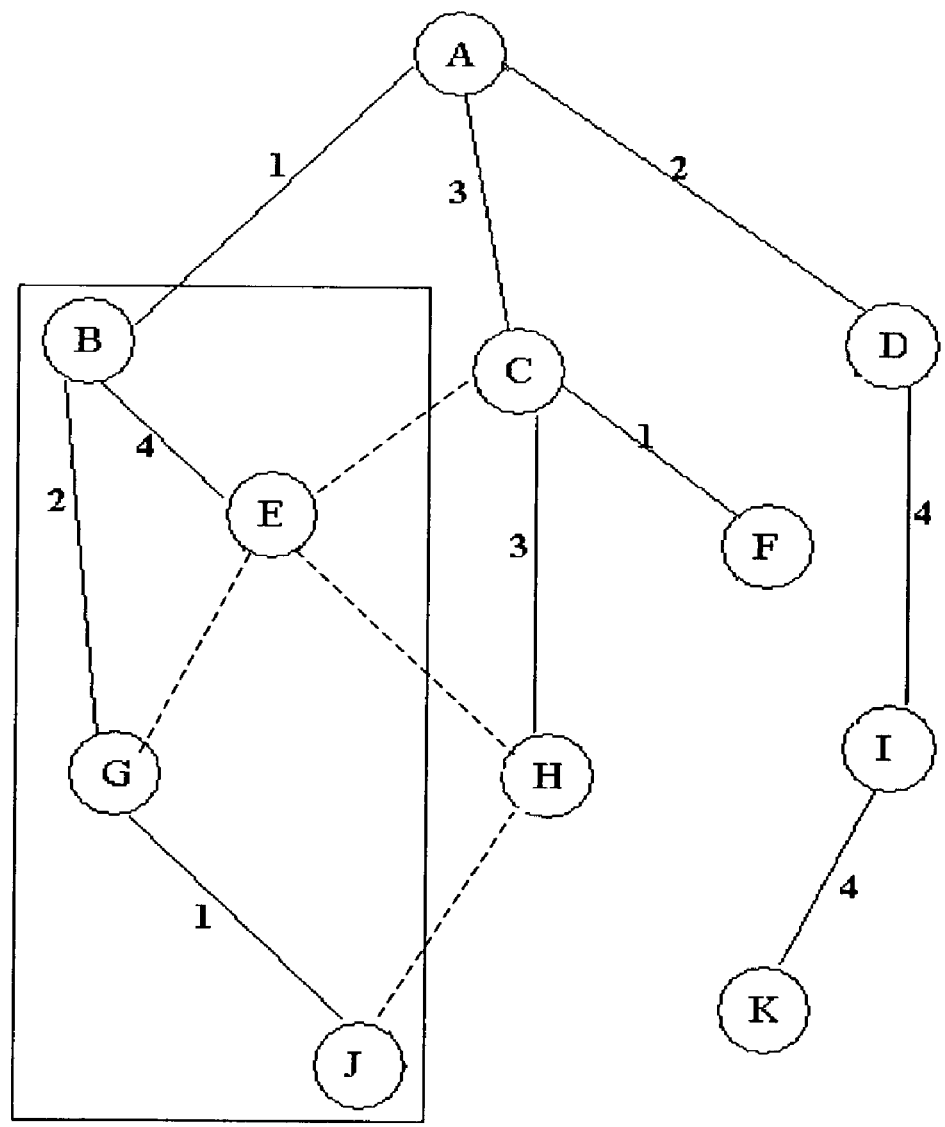
FIG. 7 is a further diagrammatic illustration of a network like that of FIG. 6 and shows those nodes disconnected by the failure of link (A, B)

All nodes are restored along the alternate path tree, which is now stored at 94 (FIG. 1a). FIG. 7 shows the invalid set for the first iteration.

First iteration: The node A assumes that the link (A, B) has gone down.

Invalid Set: [B E G J]

Interface Set: [E J]. Add E to SPT, path (A, C, E), cost=6.

With E restored, the Interface Set becomes [J B G]. Add G to SPT, path (A, C, E, G), cost=8.

With G restored, the Interface Set becomes [J B]. Add J to SPT, path (A, C, E, G, J), cost=9.

With J restored, the Interface Set becomes [B]. Add B to SPT, path (A, C, E, B), cost=10.

Figure 8:
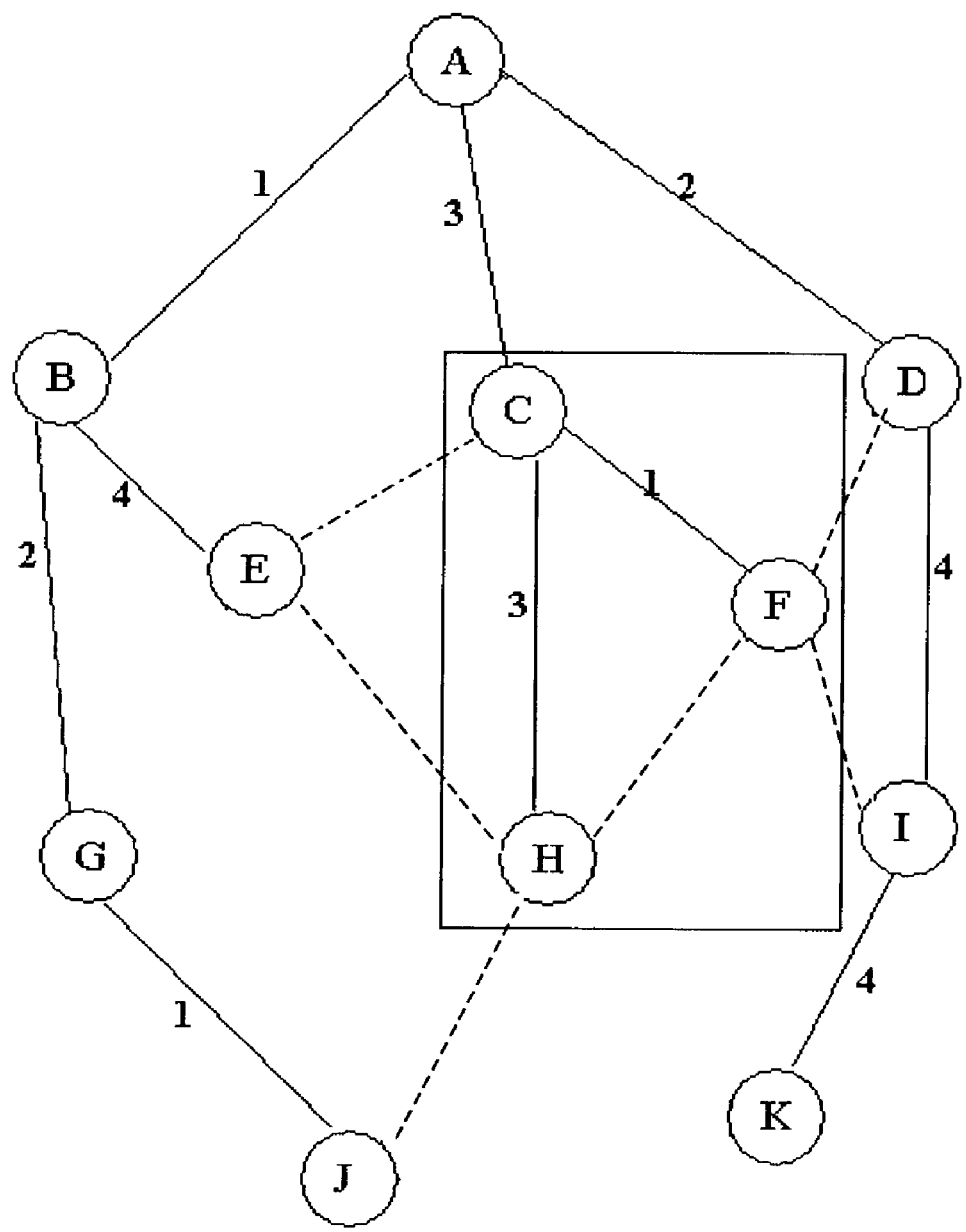
FIG. 8 is a further diagrammatic illustration of a network like that of FIG. 6 and shows those nodes disconnected by the failure of link (A, C)

All nodes are restored along the alternate path tree, which is now stored at 94 (FIG. 1a). FIG. 8 shows the invalid set for the second iteration.

Second Iteration: The node A assumes that the link (A, C) has gone down.

Invalid Set: [C H F]

Interface Set: [C H F]. Add F to SPT, path (A, D, F), cost=4.

With F restored, the Interface Set becomes [C H]. Add C to the SPT, path (A, D, F, C), cost=5.

With C restored, the Interface Set becomes [H]. Add H to the SPT, path (A, D, F, H), cost=6.

Figure 9:
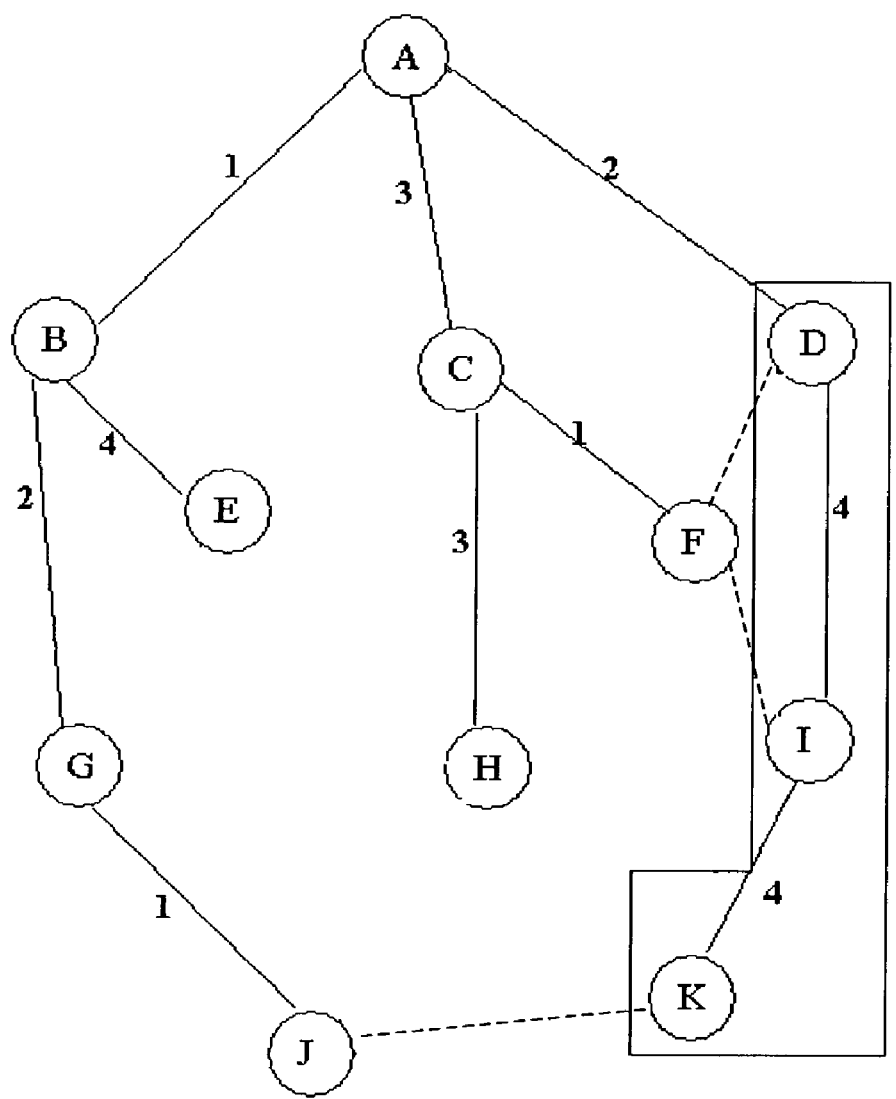
FIG. 9 is a further diagrammatic illustration of a network like that of FIG. 6 and shows those nodes disconnected by the failure of link (A, D)

All nodes are restored along this alternate path tree which is now stored at 94, (FIG. 1a). FIG. 9 shows the invalid set for the third iteration.

Third Iteration: The node A assumes that the link A-D has gone down.

Invalid Set: [D I K]

Interface Set: [D I K]. Add D to the SPT, path (A, C, F, D), cost=6.

With D restored, the Interface Set becomes [I K]. Add I to the SPT, path (A, C, F, I), cost=9.

With F restored, the Interface Set becomes [K]. Add K to the SPT, path (A, B, G, J, K), cost=10.

This completes the alternate path calculation for all the nodes in the network. The alternate paths for the nodes F, H and K are (A, D, F), (A, D, F, H) and (A, B, G, J, K) respectively. They are the same cost as the shortest paths to these nodes. Since the other paths were used as the shortest paths, these paths figure as the alternate paths.

IP Tunneling

The alternate path described above can be used to handle link failures in the network. It is important to note that the way the alternate path is calculated by each node is based on local information. Unlike the shortest path, which is calculated by all the nodes in the network using global information, each node in the network depends on its attached interfaces to calculate the alternate path.

In an IP network, the routers are only responsible for sending packets on to the next hop [3]. Under normal circumstances, the packet reaches the destination without getting into any routing loops. When the alternate path is used, the node cannot just send the packet to the next hop and expect it to be forwarded to the destination correctly. Since the calculation of the alternate path by a node assumes that a link has gone down, other nodes in the network would not know this alternate path. If a packet is sent to the next node along the alternate path, that node could turn the packet back causing a routing loop. The re-routing node, which has done the alternate path calculation, has the responsibility that the packet reaches the destination following the alternate path without any loops.

Tunneling is the most obvious way of eliminating routing loops along the alternate path, but it is not without problems. In accordance with an aspect of this invention, an efficient technique of tunneling packets that reduces overhead by optimizing the number of levels of encapsulation is provided. Remarkably, two is the maximum number of encapsulations required for IP tunneling to successfully assure a packet arriving at a target along an alternate path using the techniques of this invention.

Figure 10:
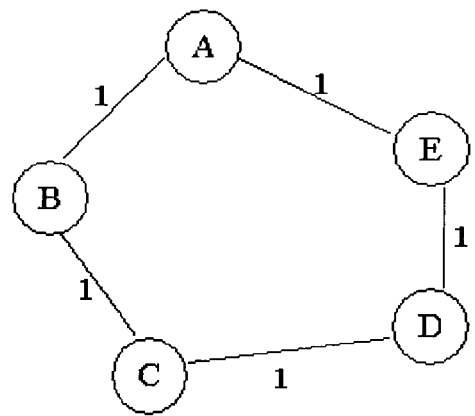
FIG. 10 is a diagrammatic illustration of a ring network like the network of the present invention and is for purposes of explanation of the causes of loops.

FIG. 10 illustrates a simple ring network. Assume cost of each link is 1. The shortest path from A to E is along (A, E) and the cost is 1. The alternate path from A to E is along (A, B, C, D, E) with a total cost of 4.

In the event of the link (A, E) going down, A starts using its alternate path to forward packets to the nodes affected by the link failure. In this particular example the nodes that are affected when (A, E) goes down are E and D. (The shortest paths to B and E are still available.) If A has to send a packet with destination E, it forwards it along to B. In the standard OSPF network, if the information about link failure has been flooded and the convergence period is over, then when B receives a packet destined for E, it forwards the packet correctly. Node B would have re-calculated its routing table and would forward the packet to C. However, if the link failure information is not propagated then B is unaware of the link failure (A, E). The shortest path from B to E is (B, A, E) with cost 2. In this case, B will send the packet back to node A causing a routing loop. A sends the packet again to B and so forth.

To overcome this problem, tunneling is used. Not only does A have to use its alternate path but it also has to make sure that the packet gets to the destination without turning back along the path. Node B needs to be told not to use its shortest path to E, which goes through node A because that would cause a loop. Instead it has to be advised to forward the packet to node C even though that is a longer path. Since none of the nodes are aware of the link failure, all the nodes along the alternate path need to be advised about the next hop to forward the packet, to avoid any loops. This amounts to source routing and can be accomplished by tunneling. The only exception is the case when the alternate path is the same cost as the shortest path. This is the case when multiple shortest paths exist for the same destination. There is no need for tunneling in such cases.

Encapsulation & Decapsulation

Figure 14:
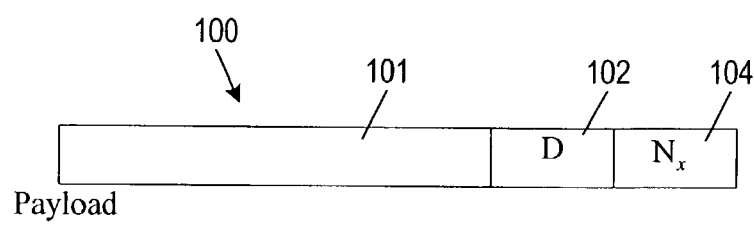
FIG. 14 is a simplified diagrammatic illustration of a communication packet having one layer of encapsulation in accordance with the invention.

IP in IP encapsulation [13] is a very well known technique. There are many RFCs [13][14] [15], which detail the mechanism of IP encapsulation. The original packet 100 with IP header 102 is graphically represented in FIG. 11. The basic idea of encapsulation is to add an outer IP header 104 before the original IP header as indicated in FIG. 14. Decapsulation on the other hand is the reverse process in which the outer additional IP header, 104 in FIG. 14, is stripped. An encapsulated IP packet hence has two or more headers. In the simplest case (two headers), the inner IP header contains the original source and destination of the packet. Such an encapsulation is depicted in FIG. 14. The outer IP header, $N_x$ of FIG. 14, on the other hand contains the source and destination addresses that identify the end points of the tunnel. Most of the other fields of the outer header are copied from the inner original header.

The encapsulation technique is used in mobile IP to reach a host, that is not in its home network. It is also used in IP networks to implement policy routing [20]. The idea is to override the normal routing path to a destination, as calculated by the routing protocol. The packet is forced to take another path depending on the tunnel configuration. This could lead to routing loops. Normally, it is totally up to the person implementing the tunneling to make sure that routing loops do not occur. Nothing guarantees that loops will not occur.

There are many techniques for encapsulation of IP packets. Some of the very popular ones are IP in IP encapsulation [13], minimum IP encapsulation [14], GRE encapsulation [15] etc. Every new technique is designed to reduce the overhead of the previous one. The idea is to minimize the processing overhead and achieve the goal of establishing the tunnel. In the proposed algorithm, multiple levels of encapsulation are needed, which means the overhead associated with the implementation is far too much compared with the normal tunneling mechanism. The choice of tunneling technique is left to the implementer and it is not discussed. Rather the focus is on reducing the levels of encapsulation in the proposed implementation.

Overhead Associated with Tunneling

Figure 11:
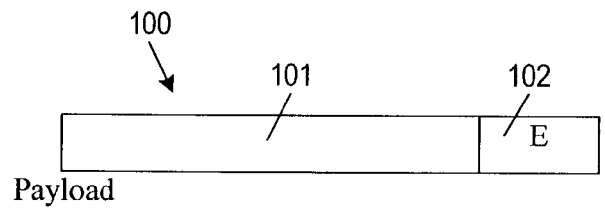
FIG. 11 is a simplified diagrammatic illustration of a communication packet with its original header.

This section discusses tunneling with respect to the ring network of FIG. 10. FIG. 11 depicts a simplistic diagrammatic view of an IP packet 100 with source node A and destination node E. The header 102 indicates the destination only.

Figure 12:
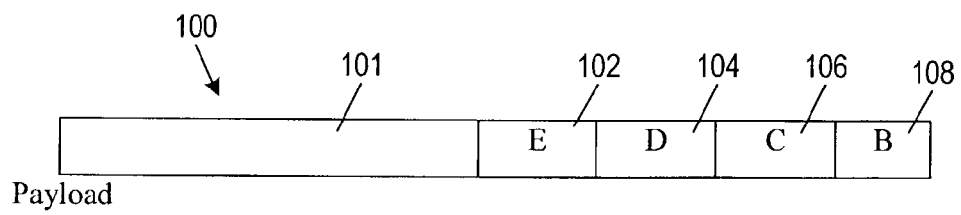
FIG. 12 is a simplified diagrammatic illustration of an encapsulated communication packet with multiple headers.

When a packet is sent from A to E along the alternate path, it is encapsulated. Such an encapsulated packet is depicted in FIG. 12. Three additional headers 104, 106 and 108 are added to the original packet. In other words it is encapsulated thrice. The packet is sent from A to B, along (A, B). It is important to note that when the packet arrives at B, the payload 101 of the packet is equal to the original payload 101 and the headers 102, 104, 106 and 108 with destination E, D and C. At the node B, the packet is decapsulated and the outer header is removed. The encapsulation technique is such that when the header is stripped at B, the contents of the header 106 indicate to B that the packet is encapsulated and not destined for itself as indicated by the outer header 108. Now B has a packet with a new header 106 and payload 101 that remains after the outermost header is removed. The node B now forwards the packet 100 with destination C as indicated by the header 106. The routing table at node B indicates that the packet has to be sent along (B, C). Once the packet reaches node C, the same procedure is repeated. The packet is decapsulated and forwarded by C along (C, D). The final stage of decapsulation is when node D, removes the last outer header which was used for encapsulation and forwards the original packet to E along (D, E).

The packet makes its way to the destination along the alternate path by a series of decapsulations and forwards. The shortest path as calculated by the routing protocol is not used at each of the intermediate nodes. This method is definitely loop-free since the source node decides the entire path that the packet takes to reach the destination. The information about the next hop to forward the packet to is encapsulated within the packet. The nodes along the alternate path use this information to find the next node to which they have to forward the packet rather than by looking up their routing table.

This kind of processing, however, has too much overhead because the packet has to be specially treated at every node along the path. Decapsulation of the packet, discovery of the fact that it is an encapsulated packet and forwarding the packet according to the next header are very processor intensive tasks. As the length of the alternate path increases, the number of levels of encapsulation also increases. Another concern is the length of the packet. Large number of levels of encapsulation increases the size of the packet. An IP packet can have a maximum size of 1500 bytes when Ethernet is used. This size is called the Maximum Transmission Unit or MTU, which is the greatest amount of data that can be sent in a single frame over the network. It includes both the payload and the headers of the packet. If the size goes beyond the MTU, the packet is fragmented and transmitted. At the receiving end, the fragments are reassembled. It is important to note that when the encapsulation technique is used, fragmentation has to be turned off because the packet not only contains the payload but also routing information. In essence any packet that is sent along the alternate path using the encapsulation technique cannot be fragmented. This imposes a serious restriction on the number of levels of encapsulation. In other words, as the size of the network grows and the length of the alternate path increases, this method becomes infeasible and falls apart.

Proposed Technique for Efficient Tunneling

To make tunneling efficient, the number of levels of encapsulation must be reduced and an efficient method chosen for encapsulation that has minimum overhead. This invention provides a way in which the number of levels of encapsulation can be reduced to a fixed number irrespective of the size of the network.

A source node needs to encapsulate a packet if it uses the alternate path to make sure that the packet reaches the destination without looping. To make sure that the packet does not turn back along its path, it is enough to tunnel the packet to an intermediate node along the alternate path from where it will not turn back. Such an intermediate node will have the property that the shortest path from that node to the destination will coincide with the remaining part of the alternate path from the source node. Intuitively, if the packet is sent more than half way down the alternate path in terms of cost, it will not turn back. This will be true if the network has symmetrical link weights, i.e. the links in the network have the same link weight in both directions. As set out above, this is a condition requisite for the methods and system of this invention. The path between two nodes will be the same in both the directions with this condition being imposed on the network.

The number of levels of encapsulation is reduced in two stages. In Stage 1, the number of levels of encapsulation is reduced by avoiding encapsulation of the packet all the way to the destination. An intermediate node is found such that if the packet is encapsulated to that node it will be sufficient to ensure that routing loops do not occur. In Stage 2, the number of levels of encapsulations is reduced to reach that intermediate node. A result is arrived at where the number of levels of encapsulation for all destinations is either 1 or 2.

Stage 1

In the Stage 1, find an intermediate node along the alternate path for each destination whose properties are described above. All occurrences of "shortest path" mean, the path calculated by Dijkstra's algorithm in the absence of any link failures. The cost of a link (A, B) is represented by C(A, B). The cost of the shortest path between two nodes S and D is represented by SP(S, D). Let the source node be S, destination node be D and the nodes along the alternate path $N_1, N_2 \ldots N_n$. The entire alternate path will then be:

$$(S, N_1, N_2, \ldots, N_n, D).$$

Find the node $N_x$ nearest to S along the alternate path, such that the shortest path from $N_x$ to D will be:

$$(N_x, N_{x+1}, N_{x+2}, \ldots, N_n, D).$$

If a packet 100 from S destined for D is tunneled to the intermediate node $N_x$, from there on it will go along the shortest path from $N_x$ to D and that path will be loop free. Now instead of encapsulating the packet all the way to D, it needs to be encapsulated only to $N_x$.

Such a node $N_x$ can be found as follows. Start examining every node along the alternate path starting with $N_1$ till the node $N_x$ is found.

1. Consider the first node along the alternate path, $N_1$. Start with the assumption:

$$N_x = N_1$$

2. For current $N_x$, calculate Cost1 and Cost2 according to the following formulae:

$$\text{Cost1} = C(N_x, N_{x+1}) + C(N_{x+1}, N_{x+2}) + \ldots + C(N_n, D)$$

$$\text{Cost2} = C(N_x, N_{x-1}) + C(N_{x-1}, N_{x-2}) + \ldots + C(N_1, S) + SP(S, D)$$

Cost 1, of course, represents the cost proceeding in the desired direction, whereas Cost 2 represents returning through the originating node. The cost of the shortest path from S to D, SP(S, D) is found from the primary routing table (created using Dijkstra's algorithm).

3. Is Cost1<Cost2?

Yes: The node $N_x$ needed has been found and the calculation ends.

No: Take the next node along the alternate path as $N_x$ and return to step 2.

This ends Stage 1 in the process of reducing the number of levels of encapsulation. An intermediate node to which the packet needs to be tunneled to instead of tunneling it all the way to the destination has been found. At the end of the first stage there is still no certainty of the number of levels of encapsulation.

Stage 2

In Stage 2, the number of levels of encapsulation needed to reach the node $N_x$ is reduced. The number of levels will either be 1 or 2 depending upon the location of the node $N_x$.

Case 1: If the node $N_x$ lies in the branch of the Shortest Path Tree in which the alternate path to node D begins, only one level of encapsulation is needed.

Case 2: If the node $N_x$ lies in the branch of the Shortest Path Tree for which the link has failed, then two levels of encapsulation are needed.

One starts this stage by examining the shortest path from S to $N_x$. The shortest path from S to $N_x$ will fall under one of these two cases.

Case 1:

The shortest path from S to $N_x$ is:

$(S, N_1, N_2, \ldots, N_x)$.

Figure 13:
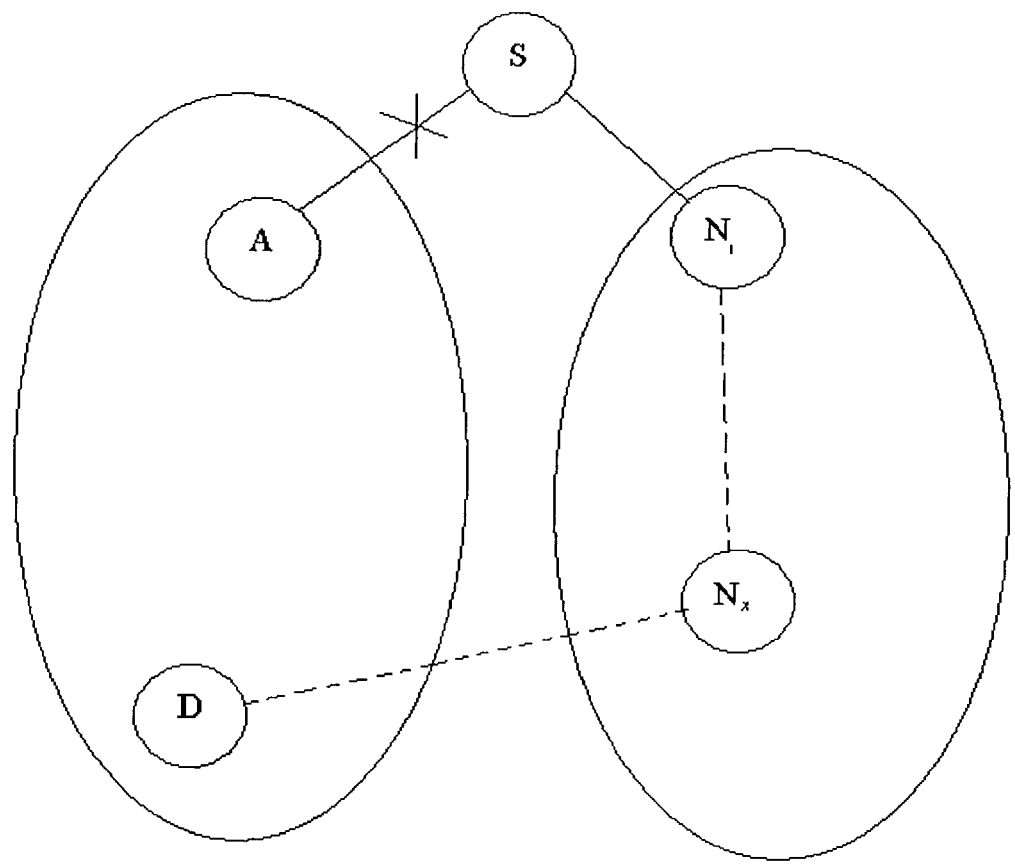
FIG. 13 is a diagrammatic illustration of a communication scenario used in explanation of the encapsulation needed in a tunneling technique in accordance with the invention.
Figure 15:
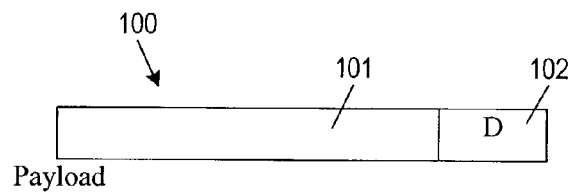
FIG. 15 is a simplified diagrammatic illustration of a communication packet like that of FIG. 14 after decapsulation.

In this case, there is no need to encapsulate the packet 100 for every hop from S to $N_x$. Here the first hop for the shortest path from S to $N_x$ is $N_1$, which is also the first hop for the alternate path from S to D. Hence to send a packet along the alternate path from S to D, one needs one extra level of encapsulation only. The scenario is depicted in FIG. 13. The packet 100 looks as shown in FIG. 14 with a single layer of encapsulation that adds the one additional header 104 to the payload 101 and original header 102. The node S sends the packet out along the interface connecting it to $N_1$, as that is the next hop for destination $N_x$. The packet 100 gets forwarded normally all the way to the node $N_x$. At the node $N_x$, the packet is decapsulated and looks as in FIG. 15 with just the payload 101 and the original header 102. Since the first hop on the shortest path from $N_x$ to D is $N_{x+1}$, the packet is forwarded correctly. The packet gets forwarded normally all the way to the node D. This way the packet reaches the destination without getting into a routing loop.

Case 2

The first hop on the shortest path from S to $N_x$ is not $N_1$. In this case, $N_x$ lies in the branch of the Shortest Path Tree of S for which the link has failed.

Two things are known:

1. The packet 100 destined for D has to be tunneled only till the node $N_x$.
2. The shortest path from S to $N_x$ cannot be used to tunnel the packet to $N_x$ because the link on the shortest path has failed.

Figure 16:
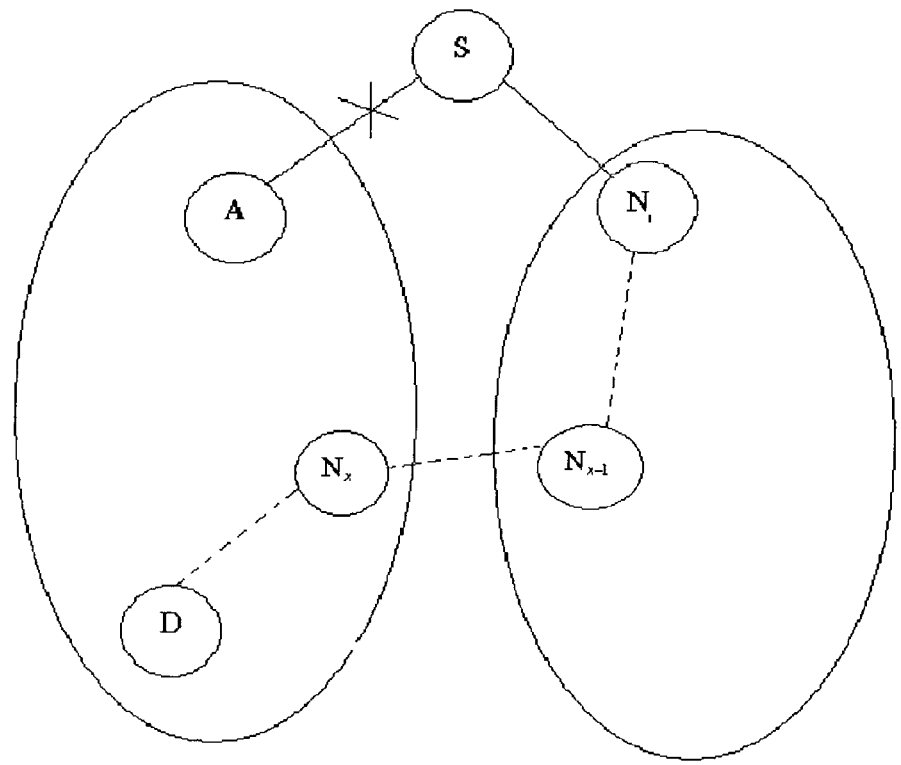
FIG. 16 is a diagrammatic illustration of a further communication scenario like that of FIG. 13 used in explanation of the encapsulation method of the invention.
Figure 17:
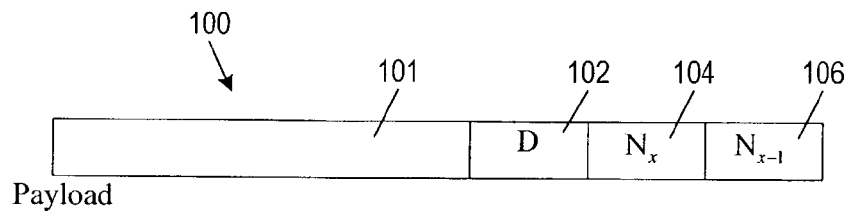
FIG. 17 is a simplified diagrammatic illustration of a communication packet with headers representing three layers of encapsulation unlike the encapsulation of the present invention.
Figure 18:
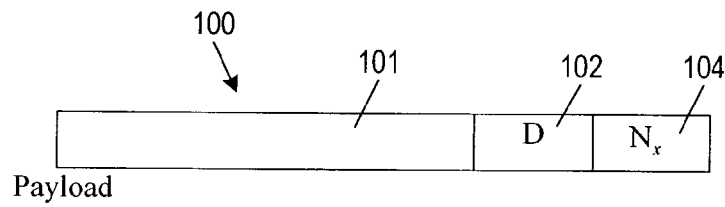
FIG. 18 is a diagrammatic illustration of a packet like that of FIG. 17 upon decapsulation removing one outer level of encapsulation.
Figure 19:
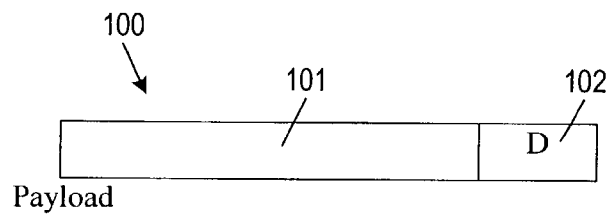
FIG. 19 is a diagrammatic illustration of a communication packet like that of FIGS. 17 and 18 after further decapsulation to remove a second outer layer of encapsulation leaving the original communication and its original header.
Figure 20:
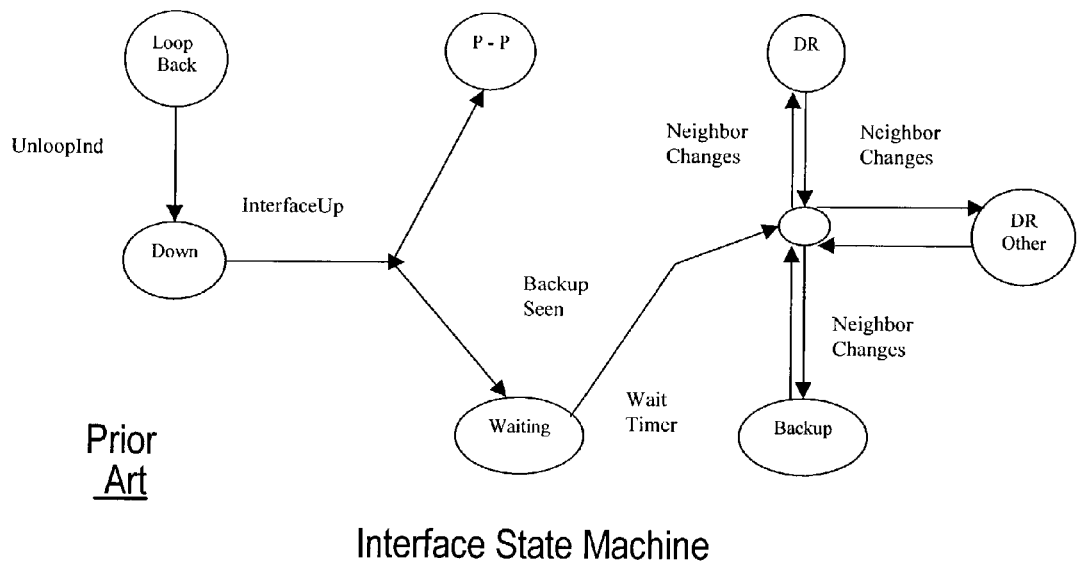
FIG. 20 is a diagrammatic illustration of a prior art state machine used in the practice of the invention.

After a packet 100 reaches a node in the branch of the failed link, it would get routed normally to the destination without getting into a loop. This is because the shortest path between the node, which the packet has reached, and the destination would lie within the same branch from the properties of a Shortest Path Tree. Therefore, if $N_x$ is in the branch of the failed link, then it must be the first node in that branch on the alternate path from S to D. In this case, two levels of encapsulation 104 and 106 are used. The packet is encapsulated to $N_{x-1}$ in the first, outer level 106. In the second, inner level 104, it is encapsulated to $N_x$ from where it takes the shortest path to reach D. The scenario is depicted in the FIG. 16. The packet looks as shown in FIG. 17 with the payload 101, original header 102, and two additional headers 104 and 106. The node S sends the packet out along the interface connecting it to $N_1$. The packet gets forwarded normally all the way to the node $N_{x-1}$. At the node $N_{x-1}$, the packet is decapsulated and is as shown in FIG. 18. The node $N_{x-1}$ forwards the packet to the node $N_x$ where it is decapsulated for the second time and is as shown in FIG. 19.

Since the shortest path from $N_x$ to D starts along $N_{x+1}$, the packet is forwarded to $N_{x+1}$. The packet gets forwarded normally all the way to the node D without getting into a routing loop. Therefore in Case 2, two levels of encapsulation are all that are needed to send the packet along the alternate path.

The node $N_x$ can lie in the branch of the Shortest Path Tree, which is entered at $N_1$. This is Case 1 and only one level of encapsulation is needed. On the other hand, if the node $N_x$ lies in the branch for which the link has failed, then it is the first node in that branch along the alternate path from S to D. This is Case 2 and two levels of encapsulation are needed. The first level is to reach the end of the branch with node $N_1$ and the second level is to go across that branch into the branch that has failed. This completes Stage 2 in the reduction of the number of levels of encapsulation.

ILLUSTRATIVE EXAMPLE

The network of FIG. 3 is used to illustrate the alternate path calculation. Table 1 gives the complete shortest path and the alternate path to all the nodes in the network from the root node A. Also, the cost of the shortest and the alternate path is included in the table.

| Destination | Shortest Path | Cost: Shortest Path | Alternate Path* | Cost: Alternate Path |
| --- | --- | --- | --- | --- |
| B | (A, B) | 1 | (A, C, E, B) | 10 |
| C | (A, C) | 3 | (A, D, F, C) | 5 |
| D | (A, D) | 2 | (A, C, F, D) | 6 |
| E | (A, B, E) | 5 | (A, C, E) | 6 |
| F | (A, C, F) | 4 | (A, D, F) | 4 |
| G | (A, B, G) | 3 | (A, C, E, G) | 8 |
| H | (A, C, H) | 6 | (A, D, F, H) | 6 |
| I | (A, D, I) | 6 | (A, C, F, I) | 9 |
| J | (A, B, G, J) | 4 | (A, C, E, G, J) | 9 |
| K | (A, D, I, K) | 10 | (A, B, G, J, K) | 10 |

*Upon failure of first link of shortest path.

For the nodes F, H, K the shortest and the alternate paths are of equal cost because they are in reality equal cost shortest paths. No encapsulation and tunneling are needed when alternate paths are used for these nodes.

The node B has shortest path (A, B) with cost 1 and alternate path (A, C, E, B) with cost 10. Two levels of encapsulation are needed to use the alternate path for node B. The intermediate node along the alternate path for node B is node E. The points of encapsulation are E and C. For all the other nodes, one level of encapsulation is sufficient to use their alternate path.

State Machines for OSPF Operation

The operation of the OSPF protocol is governed by the state of the interfaces of a router and the adjacencies that it has with other routers in the network. The protocol correctness is heavily dependent upon all the routers in the network having the most current information on the state of all interfaces. Any change in an interface has to be flooded to all the nodes of the network for them to incorporate the change in their Link State Database and recalculate routes to all nodes in the network. Keeping the Link State Database of all the routers synchronized is most important for routing to work correctly. The OSPF protocol works according to two state machines called the Interface State Machine and Neighbor State Machine. A new state machine called Re-Route State Machine is provided in a preferred embodiment of the present invention. This executes upon a link failure. In the Re-Route State Machine, pre-calculated alternate paths are used to route packets using the mechanism of tunneling.

The pre-calculated alternate paths and efficient tunneling previously described are used for re-routing. The existing state machine of OSPF is left untouched and the new state machine runs in conjunction with the existing one. The objective is to let the protocol work as is without interfering with its current operation, at the same time trying to handle link failures so that packet loss is reduced. Also, the dependence on TCP for packet re-transmission is minimized.

Interface State Machine of OSPF

Every OSPF router maintains a structure called the interface data structure [11] [12] for each interface attached to it. This is shown as 110 in the memory map 90 of FIG. 1A. The structure contains information about the interface, such as the type of interface, the state of the interface etc. Here, only those elements of the structure are discussed that are relevant in the context of link state.

Elements of Interface Data Structure

Type: This element is either broadcast or non-broadcast (multi-access, point to point, virtual link) and essentially describes the kind of network to which the interface attaches.

State: An important element, which determines whether or not adjacencies can be formed over the interface. The router's LSA will contain the state information.

HelloInterval: A router sends out hello packets on its interfaces to keep its neighbors informed that it is alive. This element is the length of time in seconds between the transmissions of two consecutive hello packets. A typical value is 10 seconds.

RouterDeadInterval: The period of time in seconds before a router's neighbor declares it down when it stops hearing the router's hello packets. A typical value is equal to four HelloInterval periods, i.e. 40 seconds.

Hello Timer: A timer, which fires every HelloInterval, seconds and causes a router to send a hello packet.

Interface output cost: This is a positive number that indicates the cost of sending a data packet on the interface. This cost is expressed in the link state metric and is advertised in the Router's LSA.

States Attained by an Interface

Figure 21:
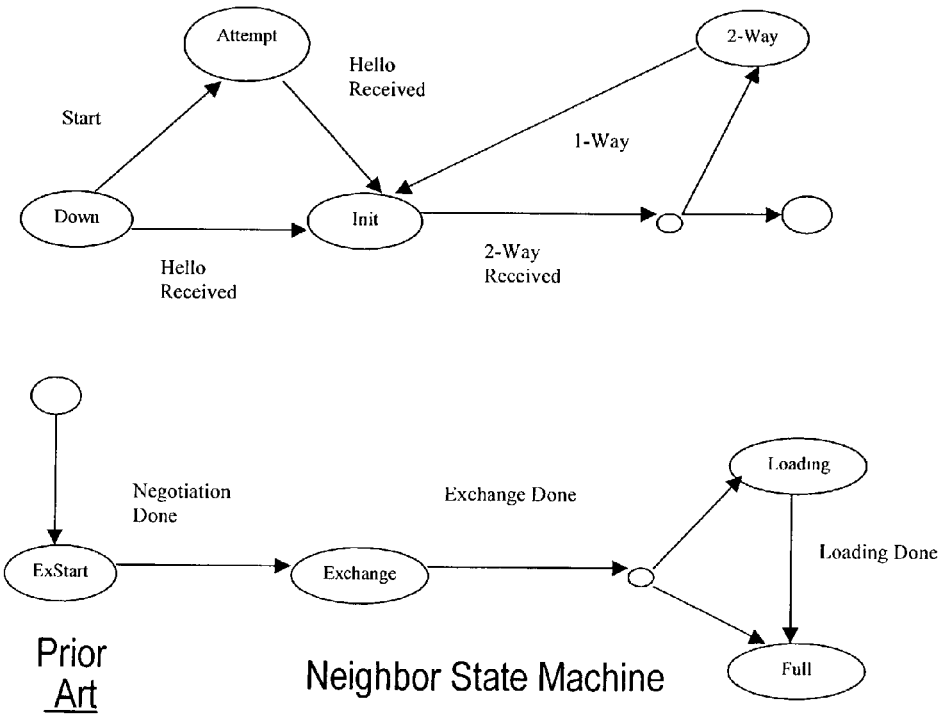
FIG. 21 is a diagrammatic illustration of a neighboring prior art state machine used in the practice of the invention.

As illustrated in FIG. 21, a router interface may exist in various states during the functioning of the protocol. The states are Down, Loopback, Waiting, Point-to-Point, DR Other, Backup and DR where DR expands as Designated Router.

Down: When the lower layer protocols have indicated that the interface is unusable, it is in the Down state. There are no adjacencies associated with the interface when it is in this state. All timers associated with this interface are disabled and no protocol traffic is sent or received on such an interface.

Point-to-Point: This state indicates that the interface is functional and that it connects to a physical point to point network or a virtual link. Hello packets are exchanged with the neighbor every HelloInterval seconds and the router tries to form an adjacency with the neighbor over that interface.

The other states, i.e. Waiting, DR Other, Backup and DR, are also operational states and deal more with the router finding out about the Designated Router (DR) on the network or trying to become the DR itself. The details of these states are not relevant to the present invention and are not further discussed. The Loopback state is when the interface is looped back either in hardware or software and is not available for regular data traffic.

Events Governing Interface State Machine

The states of an interface change with events. The events are InterfaceUp, WaitTimer, BackupSeen, NeighborChange, LoopInd, UnloopInd and IntrerfaceDown. As before, only a few events that are relevant to the present invention's dealing with link failure are discussed.

InterfaceUp: This event is an indication by the lower layers that the network interface is operational. An interface in the Down state will transition out of it on this event.

NeighborChange: Changes in a neighbor lead to the NeighborChange event, which calls for a re-calculation of the Designated Router. This event can occur when bi-directional communication is established or broken with a neighbor. Also when the neighbor's hello packet starts declaring that it is the DR or not the DR anymore, this event occurs.

InterfaceDown: This event will transition the interface to the Down state no matter what the current state is. It happens when the lower layer protocols indicate that the interface is no longer functional.

The LoopInd and UnloopInd put the interface in and out of the loop back state respectively. The WaitTimer and BackupSeen events are to do with the DR election.

State Changes of Interface State Machine

When the interface is in the Down state and the InterfaceUp event occurs, the interval Hello Timer is started and periodic sending of hello packets out the interface begins. Depending upon the network type, the state transitions to either Point-to-Point or Waiting. From the Waiting state it makes a transition to other states depending on other events. Important for the purposes of the present invention is that the Hello protocol starts functioning on the interface.

When the InterfaceDown event occurs, the Interface goes to the Down state irrespective of which state the interface is currently in. All interface timers are disabled, the variables reset, neighbor connections are destroyed and the event KillNbr is generated on all associated neighbors. Details of the neighbor state machine are discussed below.

Neighbor State Machine

An OSPF router maintains another structure called the Neighbor data structure [11] [12]. This is indicated at 112 in the memory map 98 of FIG. 1a. The conversations that an OSPF router has with its neighbors are described by this structure. A router has a neighbor for every interface. If two interfaces of a router connect to two interfaces of another router, it maintains two separate data structures for them although it is the same neighbor. The neighbor data structure contains all the information about the adjacency that a router has with its neighbor or information about one that is forming. Not all neighbors become adjacent. An adjacency is said to have been established when two neighbors synchronize their link state databases and there is a periodic exchange of hello packets between them. For the mesh network described in connection with the present invention, for example as illustrated in FIG. 3, routers connect by point-to-point links. Any two routers connected by such a link have to become adjacent. Hence in this network all neighbors are adjacent.

Elements of Neighbor Data Structure

The following are the elements of the neighbor data structure:

State, Inactivity Timer, Master/Slave, DD (Database Description) Sequence Number, Neighbor ID, Neighbor Priority, Neighbor IP address, Neighbor options, Neighbor's Designated Router and Neighbor's Backup Designated Router.

As before, described are elements that are important to the present invention.

State: This element describes the state the neighbor is in. Its value can be any of the states described in the next sections.

Inactivity Timer: A timer whose length is RouterDeadInterval seconds and fires when no Hello packet has been seen from the neighbor recently.

Neighbor ID: This is the neighbor router's OSPF router ID. When a router has multiple interfaces, the IP address of any one interface is chosen as the OSPF router ID and that is used as the identity of the router in the network.

Neighbor IP address: IP address of that interface of the neighbor, which is attached to this network. In the case of point-to-point links, as here, it is the IP address at the other end of the link.

States Attained by a Neighbor

The states attained by a neighbor are in reality the state of the conversation that a router is having with its neighbor. The conversation that a router has with its neighbor can be classified into two distinct phases. The first part of the conversation is governed by the hello protocol when the routers are exchanging information to establish two-way communication between each other. The second part of the conversation is when they exchange link state database information and become adjacent. The first part of the conversation is primarily of interest here. The various states are:

Down: There is no conversation between the two routers. This is the initial state.

Init: When a router sees a hello packet from its neighbor, the conversation is said to be in the Init state. In this state, bi-directional communication has not yet been established.

2-Way: Bi-directional communication has been established when the conversation is in this state. The routers are about to enter the second phase of the conversation in which they will start working on becoming adjacent.

The states during which adjacency formation takes place are ExStart, Exchange, Loading and Full. There is one more state called the Attempt state which happens during the first phase but is relevant only for non-broadcast networks. During this phase, hello packets are sent to neighbors occasionally even though no hello packets have been seen from the neighbor recently.

Events Governing Neighbor State Machine

The Neighbor State Machine events are HelloReceived, Start, 2-Way-Received, NegotiationDone, ExchangeDone, BadLSReq, LoadingDone, AdkOK?, SeqNumberMismatch, 1-Way, KillNbr, InactivityTimer, and LLDown. The following are of interest here:

HelloReceived: This is the event when a hello packet has been received from a neighbor.

2-Way Received: When a router sees itself listed in the other's hello packet, it indicates bi-directional communication and marks this state.

The following events can occur when the router is in any state:

1-Way: When a router receives a hello packet from a neighbor but does not see itself listed anymore, it indicates that communication is not bi-directional.

KillNbr: This event forces the neighbor to the Down state indicating that communication is impossible with the neighbor.

InactivityTimer: When a hello has not been seen from a neighbor recently, the inactivity timer fires and forces the neighbor to revert to Down state.

LLDown: An indication from the lower layer protocols that the neighbor is unreachable, again forcing the neighbor to revert to Down state.

Figure 22:
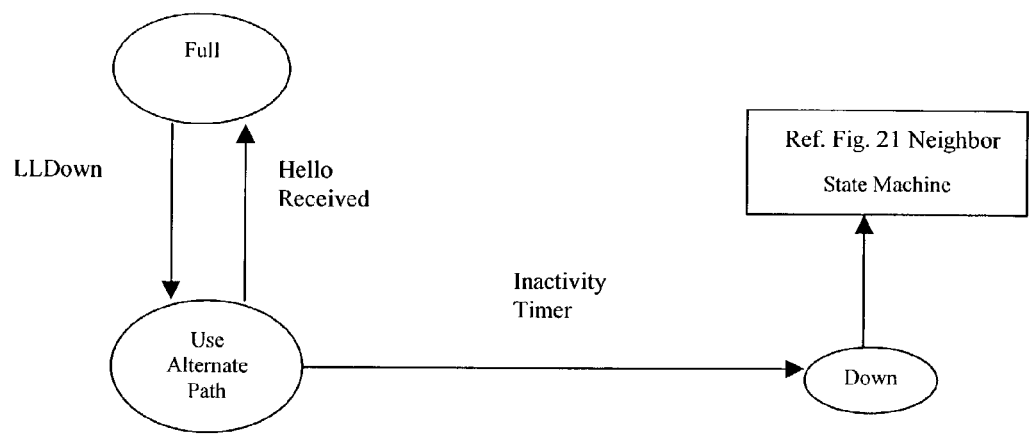
FIG. 22 is a diagrammatic illustration of a state machine in accordance with the present invention and used for rerouting communications through a network upon failure of a link.

FIG. 22 gives the complete neighbor state machine. The few state changes important here are:

In the Down state, when the HelloReceived event occurs, the new state is Init and the inactivity timer is fired. If the timer fires again, it indicates that the neighbor is dead.

In the Init state or a higher state (i.e. other than Down) when a HelloReceived event occurs, there is no change of state but the Inactivity Timer is restarted.

When a 2-WayReceived event occurs while the state is Init, the state changes to 2-Way or ExStart depending whether an adjacency will not be or will be formed between the two neighbors.

When a KillNbr or LLDown event occurs irrespective of the current state, the next state is Down. The inactivity timer is disabled and the link state retransmission, database summary and link state request lists are cleared of link state advertisements.

InactivityTimer event forces the down state and clears the above lists of link state advertisements.

A 1-WayReceived event in 2-Way or greater state, forces the nit state and clears the lists of link state advertisements.

A 2-WayReceived event in a 2-Way or greater state and a 1-WayReceived event in the Init state cause no state change and no action.

Re-Route State Machine

A new state machine called the Re-Route State Machine which uses alternate path routing and IP encapsulation as tools for its working is proposed in this chapter. Without interfering with the normal operation of the OSPF protocol, this new state machine minimizes the amount of control traffic generated and reduces packet loss or dependency on TCP for re-transmission.

Fragile links can play havoc in a network by creating too much control traffic by going up and down rapidly. There are a few architectural constants and some variables in OSPF. The values that have been set for these indicate the trade-off that the designers of the protocol had to make between control traffic and packet loss. A few important ones are as follows:

MinLSInterval, the minimum time that has to elapse before an LSA can be re-originated, has a constant value of 5 seconds in the preferred embodiment being described here.

MinLSArrival, by which a router will not accept a new instance of an LSA if the old one that it has is less old than this interval, has a constant value of 1 second.

HelloInterval, the interval at which Hello packets will be sent out on an interface is a variable value, here with a default value of 10 seconds.

RouterDeadInterval, the interval for which the router waits before declaring its neighbor to be down, has a default value here of 4 hello intervals, i.e. 40 seconds.

From these values it is known that even if a link goes up and down, the link state advertisement will not be sent out more frequently than 5 seconds. This can lead to dropped packets. But this has to be done to reduce control traffic. Link failures are detected by lower layer protocols as soon as it happens. In the worst case, when the lower layer protocols cannot detect a link failure, the hello protocol will detect it and advertise the link failure in RouterDeadInterval seconds.

Three events trigger the generation of LSAs. They are KillNbr, LLDown and InactivityTimer. More often than not it is the LLDown or the KillNbr event and in the worst case it is the InactivityTimer event.

Use Alternate Path State

Figure 23:
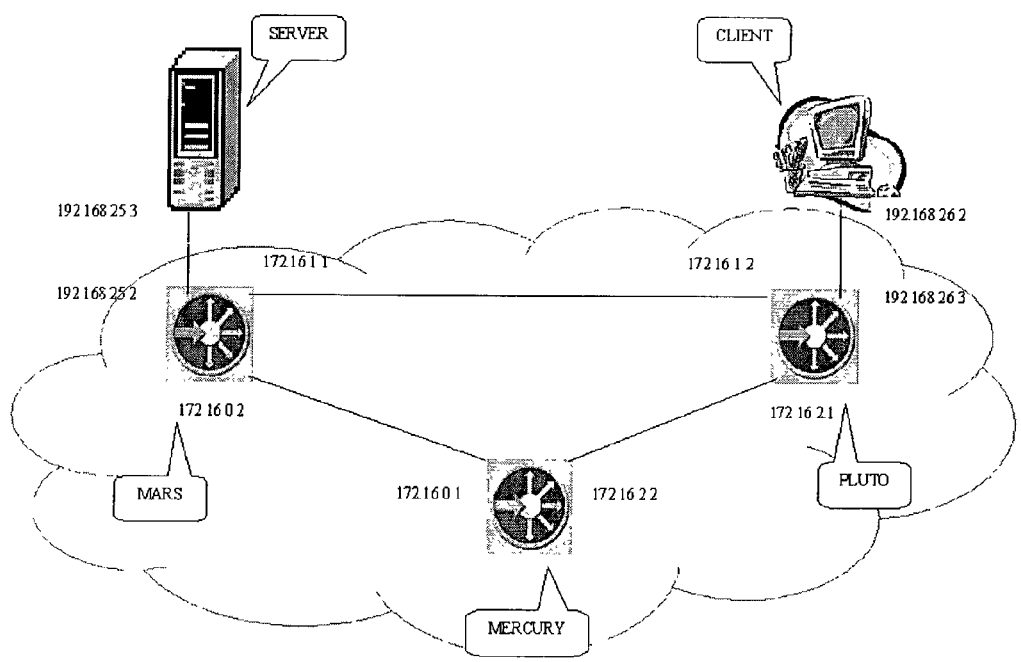
FIG. 23 is a diagrammatic illustration of a test system in accordance with the invention, having a network through which a server communicates to a client.

Turning to FIG. 23, in a preferred embodiment of this invention, a new state is provided. It is the Use Alternate Path State. In this state pre-calculated alternate paths are used for routing packets to destinations that are affected by a link failure. The link failure is not advertised yet, in anticipation that the link may come back up. The Use Alternate Path State is a transitory state during which either the link can come back up or the router can be absolutely certain that the link has gone down before it decides to announce the same. When the lower layer protocols indicate the going down of a link, instead of triggering an update, the router silently switches to the Use Alternate Path State. It is the LLDown event that causes a transition to this new state. The KillNbr event, which also normally triggers flooding, is either ignored or can be used to transition to the Use Alternate Path State. More often than not, the lower layer protocols will indicate the link status much before the KillNbr event occurs. The Inactivity Timer is used as an indication of being sure that the link has gone down and will not come back up soon. The update is sent out with the flooding algorithm and all nodes update their link state databases. Also every node re-calculates its routing table. In the meantime if a hello packet is received from a neighbor before the Inactivity Timer fires, the neighbor again silently switches to the Full state as though nothing ever happened. Following this, routing resumes in the standard manner and nobody knows that the link went down and came back up. An update about the link coming back up is not needed because one about the link going down was never sent.

Events Governing Re-Route State Machine

The Re-Route State Machine works with the events previously discussed. They are LLDown, HelloReceived and InactivityTimer. The duration of the InactivityTimer is RouterDeadInterval seconds. This is a configurable parameter and is a multiple of the HelloInterval period, which again is configurable. As previously stated, the default values are 10 seconds for HelloInterval and 40 seconds for RouterDeadInterval, i.e. 4 HelloInterval periods.

The following are the state changes of the Re-Route State Machine of FIG. 23:

Current State: Full
Event: LLDown
Next State Use Alternate Path
Action: In this state, the router uses the pre-calculated alternate path for all destinations that are affected by that interface going down.

Current State: Use Alternate Path
Event: HelloReceived
Next State Full
Action: While in this state, if a Hello packet is received from the neighbor over this interface, the neighbor state changes to Full. In the Full state, routing resumes to normal using the primary path for all destinations.

Current State: Use Alternate Path
Event: InactivityTimer
Next State Down
Action: If the InactivityTimer fires while in the Use Alternate Path state, the Down state is forced. The Link State retransmission list, Database Summary List and Link State Request list are cleared of link state advertisements.

Test Results

Referring to FIG. 23, the proposed algorithm to handle link failures was implemented and tested on the Red Hat Linux 7.1 2.96-79 platform, the kernel version being 2.4.2-2. The hardware used was the Intel 815E Value Communications Appliance [21]. The routing software used was from GNU Zebra [22]. A ring network of three routers was set up with the OSPF [12] routing protocol daemon running on the machines. Pre-calculated alternate paths were generated and saved in a routing table different from the primary routing table. It is called the Alternate Routing Table. Generic Routing Encapsulation [15] was used as the tunneling mechanism to use the alternate paths. The Re-Route State Machine was run along with the OSPF daemon to take care of link failures in the network. The mechanism of switching from using the primary routing table to the alternate routing table upon link failure and back to the primary routing table upon link restoration or re-calculation of shortest paths was accomplished using policy routing [20] techniques. The overall working of the state machine was tested.

The test network was set up as shown in the FIG. 5.1. The "cloud" shown in the figure has a ring network of three routers called Mars, Mercury and Pluto. A streaming video server was set up on the server box. The client machine connected to the server via the network and played a streaming video. To test different levels of encapsulation, different link weights were assigned to the links connecting the routers. Each time, the link connecting Mars and Pluto was failed and alternate path routing tested. The test cases with different link weights were as follows:

Test 1: The link connecting Mars and Pluto is assigned a link weight of 2, all other links having unit link weight. In this case, two equal cost paths exist from the Server to the Client. They are:
Primary: (Server, Mars, Pluto, Client), Cost=4
Alternate: (Server, Mars, Mercury, Pluto, Client), Cost=4
No encapsulation is needed to use the alternate path.

Test 2: All the links have unit link weight. In this case, the primary and alternate paths from the Server to the Client are:
Primary: (Server, Mars, Pluto, Client), Cost=3
Alternate: (Server, Mars, Mercury, Pluto, Client), Cost=4
For Mars as the calculating node, the intermediate node is Mercury. One level of encapsulation is needed to use the alternate path.

Test 3: The link connecting Mercury and Pluto is assigned a link weight of 3, all other links having unit link weight. In this case, the primary and alternate paths are:
Primary: (Server, Mars, Pluto, Client), Cost=3
Alternate: (Server, Mars, Mercury, Pluto, Client), Cost=6

For Mars as the calculating node, the intermediate node is Pluto. Two levels of encapsulation are needed to use the alternate path.

The operating system kernel has a buffer that is updated with diagnostic messages and is called the kernel ring buffer. Link status was monitored by continuously polling the kernel ring buffer. The experiment was conducted by failing the link between Mars and Pluto several times. Each time successful rerouting occurred.

ALTERNATIVE EMBODIMENTS

In one alternative embodiment, routers are implemented on a Synergy Microsystem VME single board computer running a Power PC processor and having two mezzanine cards as interfaces to links to two other routers. Choice of the appropriate mezzanine cards allow adaptation of the router, then, to optic fiber, copper, RF, microwave, IR or laser link as needed.

Another embodiment presently envisioned uses Intel's X-Scale architecture, an Intel technology based on RISC processing and built on ARM technology. This promises to be the least expensive technology.

SUMMARY

From the foregoing it will be understood that methods and apparatus for handling single link failures in a network that works effectively for fragile links has been provided. In accordance with this invention, the following direct benefits were achieved:

Single link failures in a network are handled.
Loop free routing along alternate paths is ensured.
Packet loss and packet retransmission is reduced.
Control traffic, which appears in the form of flooding link state updates, is reduced to a very large extent.
Every time there is a change in the link state in the network, the shortest path tree need not be re-computed by all routers if the information is not flooded. This results in computational savings.

In addition the following indirect benefits were achieved:
Since the number of link state updates is reduced, there are lesser transient routing loops, which occur during the convergence period.
The methods and apparatus of the invention can handle congested links by re-routing packets through alternate paths.
By using multiple paths to the same destination, improved Quality of Service (QoS) is provided.

It will be appreciated by those skilled in the art that, while preferred embodiments of the invention have been described, variations and modifications of those embodiments can be made without departure from the spirit and scope of the invention as set out in the appended claims.

REFERENCES

[1] John T. Moy, OSPF: Anatomy of an Internet Routing Protocol. Addison-Wesley, May 1998.
[2] Dimitri Bertsekas and Robert Gallager, Data Networks Second Edition. Prentice Hall, December 1991.
[3] M. Streenstrup. Routing in Communication Networks. Prentice Hall, Englewood-Cliffs, N.J., 1995.
[4] John T. Moy, OSPF: Complete Implementation. Addison-Wesley, November 2000.
[5] E. W. Dijkstra, "A note on two problems in connexion with graphs," Numerische Mathematik vol. 1, pp 269-271, 1959:
[6] P. Narvaez, K.-Y. Siu, and H.-Y. Tzeng, "Local Restoration Algorithms for Link-State Routing Protocols," ICCCN'99. Proceedings of the 1999 IEEE International Conference on Computer Communications and Networks, Boston, Mass., October 1999.
[7] P. Narvaez, K.-Y. Siu, and H.-Y Tzeng, "New Dynamic Algorithms for Shortest Path Tree Computation," IEEE/ACM Transactions on Networking, vol. 8, no. 6, December 2000.
[8] C. Labovitz, G. Malan and F. Jahanian, "Internet Routing Instability," in Proc. SIGCOMM '97, September, pp. 115-126.
[9] J. Wu, X. Lin, J. Cao, and W. Jia, "An Extended Fault-Tolerant Link-State Routing Protocol in the Internet," Proc. of 8th International Conf. on Parallel and Distributed Systems (ICPADS), June 2001.
[10] Nokia RoofTop Wireless Routing White Paper. http://www.tessco.com/industry/isp/products/pdf/white_paper.pdf
[11] J. Moy. OSPF Version 2. RFC 1583, Proteon Inc. March 1994. ftp://ftp.isi.edu/in-notes/rfc1583.txt
[12] J. Moy. OSPF Version 2. RFC 2328, Ascend Communications, Inc. April 1998. ftp://ftp.isi.edu/in-notes/rfc2328.txt
[13] C. Perkins. IP Encapsulation within IP. RFC 2003, IBM October 1996. ftp://ftp.isi.edu/in-notes/rfc2003.txt
[14] C. Perkins. Minimal Encapsulation within IP. RFC 2004, IBM October 1996. ftp:/ftp.isi.edu/in-notes/rfc2004.txt
[15] D. Farinacci, T. Li, S. Hanks, D. Meyer, P. Traina. Generic Routing Encapsulation (GRE). RFC 2784, March 2000. ftp://ftp.isi.edu/in-notes/rfc2784.txt
[16] Murali S. Kodialam, T. V. Lakshman. "Dynamic Routing of Locally Restorable Bandwidth Guaranteed Tunnels Using Aggregated Link Usage Information," INFOCOM 2001: pp 376-385
[17] Steven Lumetta, Muriel Médard. "Towards a Deeper Understanding of Link Restoration Algorithms for Mesh Networks," INFOCOM 2001: pp 367-375
[18] Steven S. Lumetta, Muriel Medard, and Yung-Ching Tseng, "Capacity versus Robustness: A Tradeoff for Link Restoration in Mesh Networks," Journal of Lightwave Technology, vol. 18, Issue 12, pp. 1765-1775, March 2000.
[19] P. Spira and A. Pan, "On finding and updating spanning trees and shortest paths," SIAM J. Computing, vol. 4, no. 3, pp. 375-380, September 1975.
[20] Matthew G. Marsh, Policy Routing Using Linux, Sams Publishing, February 2001.
[21] Intel 815E Value Communications Appliance Reference Design. http://www.intel.com/platforms/applied/eia-comm/value2/value2.htm
[22] GNU Zebra http://www.zebra.org

We claim:

1. A digital storage system comprising:
(a) a digital storage facility;
(b) a mesh network of routers connected to the digital storage facility;
(c) a plurality of access points to the network for connection to a plurality of user computers;
(d) each router in the network having a plurality of links connected between it and a neighboring router;
(e) the network operating on an open shortest path first protocol;

(f) each router being programmed for:
  (i) calculating the shortest path to other routers starting with a first hop to a neighboring router along one of the links connecting to a neighboring router;
  (ii) storing at least each shortest first path hop of each calculated shortest path;
  (iii) calculating alternate paths to other routers, which alternate paths have a first hop on another of the links connecting to a further neighboring router;
  (iv) storing the calculated alternate paths;
  (v) detecting whether links connected to the router are operable;
  (vi) for a limited time interval following detection of a link becoming inoperable, employing a previously calculated one of the alternate paths for communications to those routers for which the first hop on the calculated shortest path was along the now-inoperable link.

2. The digital storage system of claim 1, wherein the routers are further programmed, upon detection of a link being restored to operability, to restore the use of the previously calculated shortest paths for communication to routers for which an alternate path had been employed.

3. The digital storage system of claim 2, wherein the routers are further programmed to flood the remaining routers with a link state advertisement apprising the remaining routers of the detected link inoperability if the inoperability persists beyond the limited time interval.

4. The digital storage system of claim 3, wherein every router has alternate path programming that iteratively assumes failure of the links connected to that router and calculates the alternate paths to all routers connected by a calculated shortest path to that router containing the link assumed to have failed.

5. The digital storage system of claim 4, wherein the alternate path software of each router includes programming that identified a set of invalid node routers with shortest paths to that router that would be broken by failure of the assumed failed link.

6. The digital storage system of claim 5, wherein the alternate path programming calculates alternate paths only to the routers in the identified set of invalid node routers for each assumed link failure.

7. The digital storage system of claim 2, wherein the routers are further programmed to tunnel a communication packet to a router on the alternate path that is closer along the alternate path to a targeted router than along any path employing the link detected to be inoperable.

8. The digital storage system of claim 7, wherein, to tunnel a communication packet, the routers are programmed to encapsulate the packet.

9. The digital storage system of claim 8, wherein to tunnel a communication packet the routers are programmed for:
  (a) locating an intermediate router along the alternate path from a first router to an intermediate router from which the communication will not turn back, and
  (b) reducing the number of levels of encapsulation needed to reach the intermediate router.

10. The digital storage system of claim 9, wherein the routers have programming for reducing the number of levels of encapsulation by:
  (i) when the intermediate router lies in a branch of a shortest path tree of the first router, encapsulating the communication once only with instructions routing the communication to the intermediate router, and
  (ii) when the intermediate router lies in a branch of a shortest path tree for which a link has become unavailable, encapsulating the communication twice, with a first outer level of encapsulation routing the communication to a router that is the last in a path to the intermediate router before reaching the intermediate router, and with a second inner level of encapsulation routing the communication to the intermediate router.

11. The digital storage system of claim 10, wherein locating an intermediate router includes:
  (a) calculating iteratively for each router along the alternate path and until the intermediate router is identified:
    (i) Cost 1, which is the length along the alternate path from each router to a desired router, and
    (ii) Cost 2, which is the length of a path each router along the alternate path back through the first router and along the previously calculated shortest path to the desired router, and
  (b) identifying as the intermediate router the first router in the path for which Cost 1<Cost 2.

12. The digital storage system of claim 9, wherein locating an intermediate router includes:
  (a) calculating iteratively for each router along the alternate path and until the intermediate router is identified:
    (i) Cost 1, which is the length along the alternate path from each router to a desired router, and
    (ii) Cost 2, which is the length of a path each router along the alternate path back through the first router and along the previously calculated shortest path to the desired router, and
  (b) identifying as the intermediate router the first router in the path for which Cost 1<Cost 2.

13. A method of communicating between at least one initiator and at least one target comprising:
  (a) providing a mesh network of routers connected to a digital storage facility;
  (b) providing a plurality of access points to the network for connection to one or more initiators and one or more targets;
  (c) providing each router in the network with a plurality of links connected between it and neighboring routers;
  (d) operating the network on an open shortest path first protocol;
  (e) for each router:
    (i) calculating the shortest path to other routers starting with a first hop to a neighboring router along one of the links connecting to a neighboring router;
    (ii) storing at least each shortest first path hop of each calculated shortest path;
    (iii) calculating alternate paths to other routers, which alternate paths have a first hop on another of the links connecting to a further neighboring router;
    (iv) storing the calculated alternate paths;
    (v) detecting whether links connected to the router are operable;
    (vi) for a limited time interval following detection of a link becoming inoperable, employing a previously calculated one of the alternate paths for communications to those routers for which the first hop on the calculated shortest path was along the now-inoperable link.

14. The method according to claim 13, further comprising upon detection of a link being restored to operability, restoring the use of the previously calculated shortest paths for communication to routers for which an alternate path had been employed.

15. The method according to claim 14, further comprising flooding the remaining routers with a link state advertisement apprising the remaining routers of the detected link inoperability if the inoperability persists beyond the limited time interval.

16. The method according to claim 14, further comprising tunneling a communication packet to a router on the alternate path that is closer along the alternate path to a targeted router than along any path employing the link detected to be inoperable.

17. The method according to claim 16, wherein tunneling comprises encapsulating the packet with a maximum two layers of encapsulation and stripping from a received packet an outer layer of encapsulation.

18. The method according to claim 16, wherein tunneling comprises encapsulating the packet.

19. The method according to claim 18, wherein tunneling further comprises:
  (a) locating an intermediate router along the alternate path from a first router to an intermediate router from which the communication will not turn back, and
  (b) reducing the number of levels of encapsulation needed to reach the intermediate router.

20. The method according to claim 19, further comprising reducing the number of levels of encapsulation by:
  (i) when the intermediate router lies in a branch of a shortest path tree of the first router, encapsulating the communication once only with instructions routing the communication to the intermediate router, and
  (ii) when the intermediate router lies in a branch of a shortest path tree for which a link has become unavailable, encapsulating the communication twice, with a first outer level of encapsulation routing the communication to a router that is the last in a path to the intermediate router before reaching the intermediate router, and with a second inner level of encapsulation routing the communication to the intermediate router.

21. The method according to claim 20, wherein locating an intermediate router includes:
  (a) calculating iteratively for each router along the alternate path and until the intermediate router is identified:
    (i) Cost 1, which is the length along the alternate path from each router to a desired router, and
    (ii) Cost 2, which is the length of a path each router along the alternate path back through the first router and along the previously calculated shortest path to the desired router, and
  (b) identifying as the intermediate router the first router in the path for which Cost 1<Cost 2.

22. The method according to claim 19, wherein locating an intermediate router includes:
  (a) calculating iteratively for each router along the alternate path and until the intermediate router is identified:
    (i) Cost 1, which is the length along the alternate path from each router to a desired router, and
    (ii) Cost 2, which is the length of a path each router along the alternate path back through the first router and along the previously calculated shortest path to the desired router, and
  (b) identifying as the intermediate router the first router in the path for which Cost 1<Cost 2.

23. The method according to claim 13, wherein calculating alternate paths comprises iteratively assuming failure of the links connected to a router and calculating the alternate paths to all routers connected by a calculated shortest path to that router containing the link assumed to have failed.

24. The method according to claim 23, wherein calculating alternate paths further comprises identifying a set of invalid node routers with shortest paths to a router that would be broken by failure of the assumed failed link.

25. The method according to claim 24, wherein calculating alternate paths further includes calculating alternate paths only to routers in the identified set of invalid node routers for each assumed link failure.

* * * * *